US008628854B2

(12) United States Patent
Yamauchi et al.

(10) Patent No.: US 8,628,854 B2
(45) Date of Patent: Jan. 14, 2014

(54) ELECTRO-CONDUCTIVE MEMBER, PROCESS CARTRIDGE, AND ELECTROPHOTOGRAPHIC APPARATUS

(71) Applicant: Canon Kabushiki Kaisha, Tokyo (JP)

(72) Inventors: Kazuhiro Yamauchi, Suntou-gun (JP); Satoru Nishioka, Suntou-gun (JP); Masahiro Watanabe, Mishima (JP); Yuichi Kikuchi, Susono (JP); Satoru Yamada, Numazu (JP); Norifumi Muranaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/873,896

(22) Filed: Apr. 30, 2013

(65) Prior Publication Data

US 2013/0236213 A1 Sep. 12, 2013

Related U.S. Application Data

(63) Continuation of application No. PCT/JP2012/008201, filed on Dec. 21, 2012.

(30) Foreign Application Priority Data

Dec. 26, 2011 (JP) ................................ 2011-284452

(51) Int. Cl.

| | |
|---|---|
| ***B32B 27/18*** | (2006.01) |
| ***B32B 27/34*** | (2006.01) |
| ***B32B 27/36*** | (2006.01) |
| ***B32B 27/38*** | (2006.01) |
| ***B32B 27/40*** | (2006.01) |
| ***G03G 15/02*** | (2006.01) |

(52) U.S. Cl.

USPC ..... 428/413; 428/423.1; 428/447; 428/474.4; 428/480; 399/168

(58) Field of Classification Search

None

See application file for complete search history.

(56) References Cited

U.S. PATENT DOCUMENTS 6,174,959 B1 1/2001 Ciebien et al.

FOREIGN PATENT DOCUMENTS

JP 2000-63659 A 2/2000
JP 2000-186129 A 7/2000

(Continued)

OTHER PUBLICATIONS

PCT International Search Report and Written Opinion of the International Searching Authority, International Application No. PCT/JP2012/008201, Mailing Date Mar. 12, 2013.

*Primary Examiner* — Ramsey Zacharia

(74) *Attorney, Agent, or Firm* — Fitzpatrick, Cella, Harper and Scinto

(57) ABSTRACT

To suppress an excessive reduction in resistance of an electro-conductive roller under an H/H environment and reduce a resistance value thereof under an L/L environment, provided is an electro-conductive member for electrophotography, comprising: an electro-conductive mandrel; and an electro-conductive layer provided on a periphery of the mandrel, wherein the electro-conductive layer contains a binder resin having an alkylene oxide structure, and a sulfo or a quaternary ammonium group as an ion exchange group, and an ion having polarity opposite to polarity of the ion exchange group, a water content of the electro-conductive layer under a temperature of 30° C. and a relative humidity of 80% is 10 mass % or less, and a spin-spin relaxation time of the electro-conductive layer, which is determined by pulse NMR measurement with a hydrogen core being a measurement core under a temperature of 15° C. and a relative humidity of 10%, is 200 μsec or more.

11 Claims, 2 Drawing Sheets

(56) References Cited

FOREIGN PATENT DOCUMENTS

| | | | | |
|---|---|---|---|---|
| JP | 2003-221474 | A | | 8/2003 |
| JP | 2004-184512 | A | | 7/2004 |
| JP | 2005120158 | A | * | 5/2005 |
| JP | 2007-147733 | A | | 6/2007 |
| JP | 2009-3082 | A | | 1/2009 |
| JP | 2009-69783 | A | | 4/2009 |
| JP | 2010-60609 | A | | 3/2010 |

* cited by examiner

ELECTRO-CONDUCTIVE MEMBER, PROCESS CARTRIDGE, AND ELECTROPHOTOGRAPHIC APPARATUS

CROSS-REFERENCE TO RELATED APPLICATIONS

This application is a continuation of International Application No. PCT/JP2012/008201, filed Dec. 21, 2012, which claims the benefit of Japanese Patent Application No. 2011-284452, filed Dec. 26, 2011.

BACKGROUND OF THE INVENTION

1. Field of the Invention

The present invention relates to an electro-conductive member, a process cartridge, and an electrophotographic apparatus.

2. Description of the Related Art

In an electrophotographic image-forming apparatus, an electro-conductive member has been used in various fields such as a charging roller, a developing roller, and a transfer roller. The resistance value of such electro-conductive member preferably falls within the range of $10^3$ to $10^{10}\Omega$. Accordingly, the conductivity of an electro-conductive layer which the electro-conductive member includes has been adjusted with an electro-conductive agent. Here, the electro-conductive agents are roughly classified into an electronic electro-conductive agent typified by carbon black and an ionic electro-conductive agent such as a quaternary ammonium salt compound. Those electro-conductive agents each have an advantage and a disadvantage.

An electro-conductive layer that has been made conductivity with the electronic electro-conductive agent such as carbon black shows a small change in resistance value with a use environment. In addition, the electronic electro-conductive agent hardly bleeds to the surface of the electro-conductive layer, and hence there is a small possibility that the agent contaminates the surface of a member on which an electro-conductive member including such an electro-conductive layer abuts, e.g., an electrophotographic photosensitive member (hereinafter referred to as “photosensitive member”). However, it is difficult to uniformly disperse the electronic electro-conductive agent in a binder resin and hence the electronic electro-conductive agent is liable to agglomerate in the electro-conductive layer. Accordingly, local unevenness of the resistance value may occur in the electro-conductive layer.

On the other hand, in the case of an electro-conductive layer that has been made conductivity with the ionic electro-conductive agent, the ionic electro-conductive agent is uniformly dispersed in a binder resin as compared with the electronic electro-conductive agent. Accordingly, local resistance unevenness hardly occurs in the electro-conductive layer. However, the ion-conducting performance of the ionic electro-conductive agent is susceptible to the amount of moisture in the binder resin under a use environment. Accordingly, the resistance value of the electro-conductive layer that has been made conductivity with the ionic electro-conductive agent increases under a low-temperature, low-humidity environment (having a temperature of 15° C. and a relative humidity of 10%) (hereinafter sometimes referred to as “L/L environment”), and reduces under a high-temperature, high-humidity environment (having a temperature of 30° C. and a relative humidity of 80%) (hereinafter sometimes referred to as “H/H environment”). That is, the electro-conductive layer involves a problem in that the environmental dependence of its resistance value is large.

Further, when a direct-current voltage is applied to an electro-conductive member including the electro-conductive layer that has been made conductivity with the ionic electro-conductive agent over a long time period, the following tendency has been observed. A cation and anion constituting the ionic electro-conductive agent are polarized in the electro-conductive layer, an ion density in the electro-conductive layer reduces, and the resistance value of the electro-conductive layer gradually increases.

Japanese Patent Application Laid-Open No. 2000-186129 proposes that an ionic functional group be introduced into a molecular structure of a silicone-modified urethane polymer to impart charge-removing property to the polymer itself instead of a charge-removing method using an electro-conductive agent such as carbon powder.

SUMMARY OF THE INVENTION

In the case of a charging roller that is placed so as to abut on a photosensitive drum in an electrophotographic apparatus and charges the photosensitive drum as an example of the electro-conductive member, when the resistance increases under the L/L environment, a charging failure may occur. In addition, an excessive reduction in resistance under the H/H environment may cause a pinhole leak. The pinhole leak is the following phenomenon. When the photosensitive layer of the photosensitive drum has a faulty site, an excessive current converges from the charging roller to the faulty site, and hence a portion that cannot be charged occurs around the faulty site of the photosensitive layer.

In addition, when an ionic electro-conductive charging roller is used in an AC/DC charging system as a system involving applying a voltage obtained by superimposing an alternating-current voltage (AC voltage) on a direct-current voltage (DC voltage) to the charging roller, a reduction in resistance of the ionic electro-conductive charging roller under the high-temperature, high-humidity environment causes an excessive amount of a discharge current. Although the AC/DC charging system is an excellent contact charging method that is hardly affected by external circumstances such as an environment, the applied voltage oscillates and hence the total amount of the discharge current increases as compared with that in a DC charging system. As a result, the rate at which the photosensitive drum deteriorates is remarkably large as compared with that in the DC charging system, thereby shortening the lifetime of the photosensitive drum. Further, such rate causes image deletion as an image failure resulting from a discharge product such as a nitrogen oxide. Therefore, the discharge current amount needs to be additionally reduced in the AC/DC charging system. However, when the discharge current amount is insufficient, such an electrophotographic image that minute black dots occur in a spot manner over the entire surface (hereinafter, sometimes referred to as “sandy image”) may occur. It has been difficult to solve the problems in the AC/DC charging system while suppressing the occurrence of such sandy image. Particularly under the high-temperature, high-humidity environment, a discharge current amount needed for suppressing the sandy image has become excessive owing to the reduction of the resistance of the ionic electro-conductive charging roller in some cases.

In the case of a developing roller, which is used as a toner carrying member upon visualization of an electrostatic latent image formed on a photosensitive member as a toner image in an electrophotographic apparatus, as another example of the electro-conductive roller as well, an increase and excessive reduction in resistance value lead to challenges.

When the resistance of the developing roller increases under the L/L environment, charges accumulated on the developing roller may become unlikely to be discharged. As a result, there may occur a "fogging" image, in which toner is developed in a portion other than an image portion. On the other hand, when the resistance of the developing roller excessively reduces under the H/H environment, the pinhole leak may occur as in the case of the charging roller.

The same holds true for a transfer roller as another example of the electro-conductive roller. The deviation of its resistance from a proper range may affect the quality of a transferred image.

As described above, an electro-conductive member including an electro-conductive layer that has been made conductivity with an ionic electro-conductive agent may cause various problems as described above as a result of a great change in resistance value caused by the use environment.

In view of the foregoing, the present invention is directed to providing an electro-conductive member for electrophotography showing a stable resistance value under various use environments. Further, the present invention is directed to providing a process cartridge and an electrophotographic apparatus capable of stably providing high-quality electrophotographic images over a long time period.

According to one aspect of the present invention, there is provided an electro-conductive member for electrophotography, comprising: an electro-conductive mandrel; and an electro-conductive layer provided on a periphery of the mandrel, wherein the electro-conductive layer contains a binder resin having, in a molecule thereof, an alkylene oxide structure, and a sulfo group or a quaternary ammonium group as an ion exchange group, and an ion having polarity opposite to polarity of the ion exchange group, a water content of the electro-conductive layer under an environment of a temperature of 30° C. and a relative humidity of 80% is 10 mass % or less, and a spin-spin relaxation time T2 of the electro-conductive layer, which is determined by pulse NMR measurement with a hydrogen core being a measurement core under an environment of a temperature of 15° C. and a relative humidity of 10%, is 200 μsec or more.

According to another aspect of the present invention, there is provided a process cartridge, comprising the above-described electro-conductive member, wherein the process cartridge is detachably mountable to a main body of an electrophotographic apparatus. According to further aspect of the present invention, there is provided an electrophotographic apparatus comprising the above-described electro-conductive member.

According to the present invention, the excessive reduction in resistance of an electro-conductive member under the H/H environment can be suppressed, and at the same time, the resistance value under the L/L environment can be reduced. As a result, the resistance value can be optimized without depending on the use conditions and the use environment, and an electro-conductive member in which contamination of a photosensitive member is suppressed can be obtained. Further, according to the present invention, provided are the process cartridge and the electrophotographic apparatus capable of providing high-quality electrophotographic images.

Further features of the present invention will become apparent from the following description of exemplary embodiments with reference to the attached drawings.

DESCRIPTION OF THE EMBODIMENTS

Figure 1A:
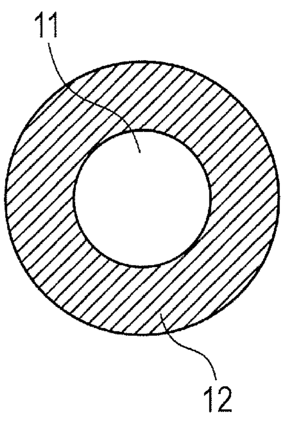
FIG. 1A is a schematic sectional view illustrating an example of an electro-conductive member for electrophotography of the present invention.

The inventors of the present invention have considered the following. In order that the resistance value of an electro-conductive member for electrophotography may be optimized independent of a use environment, it is necessary that an excessive reduction in resistance under an H/H environment be first suppressed by reducing the amount of moisture in a binder resin, and a resistance value under an L/L environment be reduced.

A conductivity σ representing an electrical characteristic can be represented by the following numerical expression 1.

$$\sigma = qn\mu \quad \text{(Numerical expression 1)}$$

Here, σ represents the conductivity, q represents the charge of a carrier, n represents a carrier density, and μ represents a carrier mobility. A carrier in the case of ionic conduction is an ionic electro-conductive agent ionized by the dissociation of an anion and a cation. In general, the ionic electro-conductive agent is formed of an ion exchange group such as a quaternary ammonium group and an ion opposite in polarity to the group (such as a chloride ion), and shows ionic conductivity as a result of the movement of both the group and the ion in the binder resin.

Water in the binder resin increases n in the numerical expression 1 because the water promotes the ionic dissociation of the ionic electro-conductive agent. Further, the presence of water having a low viscosity in the binder resin increases μ because the presence facilitates the migration of an ion. In other words, the major factor for a large change in resistance value of the electro-conductive roller with a use environment may be a change in amount of moisture in the binder resin. Accordingly, under the H/H environment in which the binder resin is liable to absorb water, a phenomenon in which the resistance of the binder resin reduces more than necessary cannot be avoided.

Then, the inventors of the present invention have considered reducing the resistance value without depending on the amount of moisture in the binder resin so as to reduce use environment dependency of the resistance value of the electro-conductive roller. As a result, the inventors have found that an electro-conductive layer satisfying the following four conditions exhibits a stable resistance value without depending on the use environment.

(Condition 1): A water content of an electro-conductive layer under an environment of a temperature of 30° C. and a relative humidity of 80% is 10 mass % or less.

(Condition 2): A spin-spin relaxation time T2 of an electro-conductive layer, which is determined by pulse NMR measurement with a hydrogen core being a measurement core under an environment of a temperature of 15° C. and a relative humidity of 10%, is 200 μsec or more.

(Condition 3): A binder resin for forming an electro-conductive layer has an alkylene oxide structure in its molecule.

(Condition 4): A sulfo group or a quaternary ammonium group, which contributes to ion conduction, is linked to a binder resin through a chemical bond.

That is, by satisfying the condition 1, the amount of moisture in the binder resin can be reduced to suppress an excessive reduction in resistance value under the H/H environment. This is a necessary condition for reducing the resistance value without depending on the amount of moisture in the binder resin.

In order to reduce the resistance under the L/L environment while the condition 1 is satisfied, the condition 2 is required. By satisfying the condition 2, the molecular mobility of the binder resin can be enhanced. As a result, the reduction in resistance under the L/L environment can be achieved without depending on the amount of moisture in the binder resin. This means that μ in the numerical expression 1 under the L/L environment is increased. It should be noted that the molecular mobility of the binder resin can be generally evaluated based on the spin-spin relaxation time T2 determined by pulse NMR measurement with a hydrogen core being a measurement core, and the longer relaxation time T2 means higher molecular mobility.

Further, as a result of the study by the inventors of the present invention, it was found that, in order to achieve the reduction in resistance under the L/L environment, only the condition 2 is insufficient, and the condition 3 needs to be satisfied in addition to the conditions 1 and 2. The alkylene oxide structure has the effect of promoting ionic dissociation in the same way as water, and hence, can reduce resistance under the L/L environment even under the condition of a small amount of moisture in the binder resin. This means that n in the numerical expression 1 under the L/L environment is increased. By satisfying the conditions 1 to 3, the excessive reduction in resistance under the H/H environment can be suppressed, and at the same time, the resistance value under the L/L environment can be reduced.

Still further, in order to control the resistance value of the electro-conductive member to a desired value stably, the condition 4 is also required. A binder resin satisfying the conditions 1 to 3 has high hydrophobicity and high flexibility, compared with those of the ionic electro-conductive agent. Thus, in the case where a general ionic electro-conductive agent formed of a cation and an anion is added to the binder resin, the ionic electro-conductive agent bleeds to the surface of the binder resin according to the present invention, with the result that the resistance of the binder resin becomes liable to increase. By linking a sulfo group or a quaternary ammonium group, which contributes to ion conduction, to the binder resin for forming an electro-conductive layer through a chemical bond, the increase in resistance of the binder resin can be suppressed.

The present invention is described in detail below by way of a roller-shaped electro-conductive roller, charging roller, developing roller, and the like as representative examples of the electro-conductive member for electrophotography.

Figure 1B:
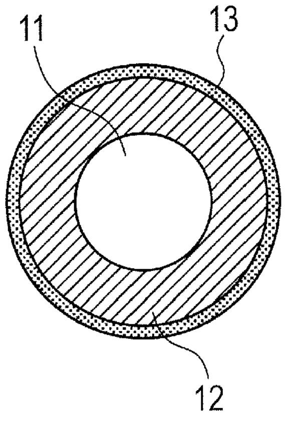
FIG. 1B is a schematic sectional view illustrating an example of the electro-conductive member for electrophotography of the present invention.
Figure 1C:
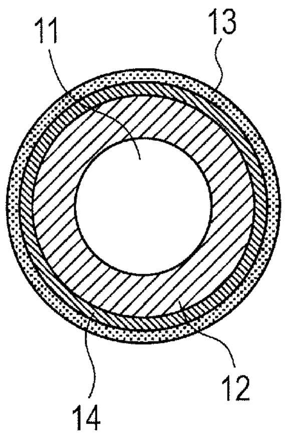
FIG. 1C is a schematic sectional view illustrating an example of the electro-conductive member for electrophotography of the present invention.

FIGS. 1A to 1C are each a schematic view illustrating an aspect of the electro-conductive member according to the present invention. The roller-shaped electro-conductive member is, for example, as illustrated in FIG. 1A, constructed of an electro-conductive mandrel 11 and an elastic layer 12 which is provided on the outer periphery of the electro-conductive mandrel 11. In this case, the elastic layer 12 is the electro-conductive layer according to the present invention and contains the binder resin according to the present invention. In addition, the electro-conductive member may be such that a surface layer 13 is formed on the outer periphery of the elastic layer 12 as illustrated in FIG. 1B. In this case, at least one of the elastic layer 12 and the surface layer 13 is the electro-conductive layer according to the present invention and contains the binder resin according to the present invention. Further, as necessary, other electro-conductive layers may be incorporated as long as the effects of the present invention are not impaired. Further, the electro-conductive member may be of a three-layer structure in which an intermediate layer 14 is placed between the elastic layer 12 and the surface layer 13 as illustrated in FIG. 1C, or a multilayer construction in which the multiple intermediate layers 14 are placed. In this case, in the same way as described above, at least one of the layers is the electro-conductive layer according to the present invention, and the electro-conductive layer contains the binder resin according to the present invention.

<Electro-Conductive Mandrel>

A mandrel appropriately selected from those known in the field of an electro-conductive member for electrophotography can be used as the electro-conductive mandrel. The mandrel is, for example, a column obtained by plating the surface of a carbon steel alloy with nickel having a thickness of about 5 μm.

<Electro-Conductive Layer>

The electro-conductive layer according to the present invention includes a binder resin having, in a molecule thereof, an alkylene oxide structure, and a sulfo group or a quaternary ammonium group as an ion exchange group, and an ion having polarity opposite to the polarity of the ion exchange group. In addition, the electro-conductive layer according to the present invention has a water content under an environment of a temperature of 30° C. and a relative humidity of 80% of 10 mass % or less, and a spin-spin relaxation time T2, which is determined by pulse NMR measurement with a hydrogen core being a measurement core under an environment of a temperature of 15° C. and a relative humidity of 10%, of 200 μsec or more.

Hereinafter, the electro-conductive layer according to the present invention is described.

(Ion Exchange Group)

The ion exchange group according to the present invention is a functional group having ionic dissociation property and is bonded to the binder resin according to the present invention through a covalent bond. The ion exchange group according to the present invention is a sulfo group or a quaternary ammonium group having high ionic dissociation performance.

The ion exchange group being covalently bonded to the binder resin is advantageous for preventing the ionic electro-conductive agent from bleeding and suppressing a change in resistance value when a direct current flows for a long period of time. The ion exchange group may be introduced into a main chain of the binder resin and may also be introduced into a molecular terminal.

(Ion Having Polarity Opposite to Polarity of Ion Exchange Group)

The electro-conductive layer according to the present invention contains an ion having polarity opposite to the polarity of the ion exchange group (hereinafter referred to as "counter ion").

When the ion exchange group is a sulfo group, examples of the counter ion include cations such as a proton, alkali metal ions, e.g., a lithium ion, a sodium ion, and a potassium ion, an ion of an imidazolium compound, an ion of a pyrrolidinium compound, and an ion of a quaternary ammonium compound.

When the ion exchange group is a quaternary ammonium group, examples of the counter ion include anions such as halide ions, e.g., a fluoride ion, a chloride ion, a bromide ion, and an iodide ion, a perchlorate ion, an ion of a sulfonic acid compound, an ion of a phosphoric acid compound, an ion of a boric acid compound, and a sulfonylimide ion.

Of the ion species, a sulfonylimide ion, an imidazolium ion, or a pyrrolidinium ion is preferred as the counter ion because it is preferred that the electro-conductive layer according to the present invention can achieve the reduction of the resistance under the L/L environment. In particular, the sulfonylimide ion is suitable from the following viewpoint. The ion has high hydrophobicity and hence its affinity for the binder resin according to the present invention easily improves as compared with that of a general ion having high hydrophilicity. As a result, the ion is uniformly dispersed in the binder resin and hence the unevenness of the resistance value resulting from dispersion unevenness can be additionally reduced.

Specific examples of the sulfonylimide ion include, but are not limited to, bis(trifluoromethanesulfonyl)imide ion, bis(pentafluoromethanesulfonyl)imide ion, bis(nonafluorobutanesulfonyl)imide ion, and cyclo-hexafluoropropane-1,3-bis(sulfonyl)imide ion.

The presence of the counter ion in the electro-conductive layer can be verified by an extraction experiment involving utilizing an ion-exchange reaction. The electro-conductive layer is stirred in a dilute aqueous solution of hydrochloric acid or sodium hydroxide, followed by the extraction of an ion in the electro-conductive layer into the aqueous solution. The aqueous solution after the extraction is dried and then an extract is collected. After that, the extract is subjected to mass spectrometry with a time-of-flight mass spectrometer (TOF-MS). Thus, the ion can be identified. Further, the identification of the ion according to the present invention is additionally facilitated by performing elemental analysis through the inductively coupled plasma (ICP) emission spectrometry of the extract and combining the result with the result of the mass spectrometry.

(Binder Resin)

The binder resin according to the present invention needs to satisfy all the conditions 1 to 4. Hereinafter, the details thereof are described.

(Condition 1)

By making the binder resin hydrophobic, the amount of moisture in the binder resin is reduced to prevent an excessive reduction in resistance under the H/H environment. The binder resin has a feature of reducing the amount of moisture in the binder resin. Therefore, even in the case where the electro-conductive layer contains a roughness imparting particle, a filler, a softening agent, or the like in addition to the binder resin, the water content of the electro-conductive layer needs to be sufficiently low. Thus, it is necessary that the water content of the electro-conductive layer be 10 mass % or less under the H/H environment. As a result of the study, the inventors of the present invention confirmed that, when the water content of the electro-conductive layer exceeds 10 mass %, the resistance value of the electro-conductive layer under the H/H environment becomes almost constant without depending on the water content. The reason for this is considered as follows. A major part of ions in the electro-conductive layer is already dissociated under the condition of a water content of 10 mass %, and hence, the number of ions in the electro-conductive layer hardly changes even in the case where the water content exceeds 10 mass %. As is understood from the above-mentioned result, the reduction in resistance value under the H/H environment can be suppressed by setting the water content to 10 mass % or less. The water content of the electro-conductive layer is more preferably 6 mass % or less, still more preferably 4 mass % or less, still more preferably 2 mass % or less under the H/H environment. The resistance value under the H/H environment depends on the water content of the electro-conductive layer very strongly. In the case of setting the water content to 6 mass % or less while satisfying the conditions 2 to 4, the volume resistivity of the electro-conductive layer under the H/H environment can be controlled to $1\times10^4$ Ω·cm to $1\times10^7$ Ω·cm. By setting the volume resistivity of the electro-conductive layer in the above-mentioned range, the occurrence of abnormal discharge caused by leakage can be suppressed. In the case of setting the water content to 4 mass % or less while satisfying the conditions 2 to 4, the volume resistivity of the electro-conductive layer can be controlled to $1\times10^5$ Ω·cm to $1\times10^7$ Ω·cm. By setting the volume resistivity of the electro-conductive layer in the above-mentioned range, the occurrence of abnormal discharge caused by leakage can be suppressed and excessive discharge in the case of AC/DC charging can be reduced. In the case of setting the water content to 2 mass % or less, excessive discharge in the case of AC/DC charging can be reduced further.

Although the electro-conductive layer may be formed through use of any binder resin as long as the binder resin satisfies the above-mentioned condition, the condition 1 can be satisfied easily by introducing a siloxane structure into the binder resin. Further, the siloxane structure has high molecular mobility, and hence, is also suitable as means for satisfying the condition 2. Further, it is preferred that the electro-conductive layer having a siloxane structure introduced therein be used as the outermost layer of an electro-conductive roller, because the surface free energy of the electro-conductive roller is decreased to reduce the adhesion of foreign matter such as a toner and an external additive of the toner. As the siloxane structure, for example, a structure represented by the following formula (2) is preferred.

Formula (2)

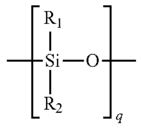

In the formula, $R_1$ and $R_2$ each independently represent a methyl group or an unsubstituted phenyl group. q represents an integer of 1 or more.

In addition to the binder resin according to the present invention, a roughness imparting particle, a filler, a softening agent, or the like may be added to the electro-conductive layer according to the present invention as long as the effects of the present invention are not impaired. The content of the binder resin in the electro-conductive layer is preferably 20 mass % or more, more preferably 40 mass % or more. The reason for this is as follows. The electro-conductive layer shows ionic conductivity as a result of the formation of a continuous phase by the binder resin therein and setting the content of the binder resin to 40 mass % or more facilitates the formation of the continuous phase.

The water content in the electro-conductive layer can be measured by the following method. The electro-conductive member is left to stand under the H/H environment for 3 days or more, and the electro-conductive layer is cut out from the electro-conductive member. The test piece thus cut out from the electro-conductive member is packed and sealed in a measurement cell under the H/H environment. The measurement cell in which the test piece is sealed can be measured for the amount of moisture in the electro-conductive layer through use of Karl Fischer Moisture Titrator.

(Condition 2)

A resin having high molecular mobility is used as the binder resin to facilitate the movement of an ion, thereby achieving the reduction in resistance under the L/L environment. However, when the electro-conductive layer contains a softening agent, a filler having a submicron size or less, and the like in addition to the binder resin, the molecular mobility of the binder resin changes, with the result that the resistance value under the L/L environment changes. Accordingly, in the present invention, it is necessary that the spin-spin relaxation time T2 determined by pulse NMR measurement with a hydrogen core being a measurement core under the L/L environment be set to 200 μsec or more with respect to the electro-conductive layer.

As a result of the study by the inventors of the present invention, it was difficult to set the volume resistivity of the electro-conductive layer under the L/L environment to $5\times10^7$ Ω·cm or less when the spin-spin relaxation time T2 according to the present invention is less than 200 μsec while the condition 1, and the conditions 3 and 4 are satisfied. The reason for this is considered as follows. In order to reduce a resistance value under the L/L environment, it is also necessary that the condition 3 be satisfied simultaneously. However, when the spin-spin relaxation time T2 is less than 200 μsec, the molecular mobility of an alkylene oxide in the binder resin is inhibited. In order to cause the alkylene oxide in the binder resin to dissociate ions, it is advantageous that the distance between the alkylene oxide and the ions is smaller. For this purpose, it is considered to be important that the molecular mobility of the alkylene oxide itself is also high. From the foregoing result, it is considered that the resistance value under the L/L environment can be reduced by setting the spin-spin relaxation time T2 to 200 μsec or more.

The spin-spin relaxation time T2 of the electro-conductive layer is more preferably 300 μsec or more, still more preferably 500 μsec or more under the L/L environment. The resistance value under the L/L environment depends on the flexibility of the electro-conductive layer very strongly. When the spin-spin relaxation time T2 is 300 μsec or more while the condition 1, and the conditions 3 and 4 are satisfied, the volume resistivity of the electro-conductive layer can be controlled to $1\times10^6$ Ω·cm to $1\times10^8$ Ω·cm. By setting the volume resistivity of the electro-conductive layer in the above-mentioned range, charging defects under the L/L environment can be suppressed relatively easily without depending on the roller construction. When the spin-spin relaxation time T2 is set to 500 μsec or more while the condition 1, and the conditions 3 and 4 are satisfied, the volume resistivity of the electro-conductive layer can be controlled to $5\times10^5$ Ω·cm to $1\times10^8$ Ω·cm. By setting the volume resistivity of the electro-conductive layer in the above-mentioned range, even when a process speed of an electrophotographic apparatus is high, the charging defects under the L/L environment can be suppressed relatively easily without depending on the roller construction.

It should be noted that, in order to satisfy the above-mentioned conditions, for example, it is appropriate to use a binder resin having a low crosslinking density as the binder resin in the electro-conductive layer and a resin having high molecular mobility as the monomer unit forming the binder resin. Examples of the monomer unit having high molecular mobility include a siloxane structure, an alkylene oxide structure, and a straight chain alkyl structure. Of those, a siloxane structure is suitable because the condition 1 can also be satisfied simultaneously.

In order to control the crosslinking density of the binder resin, for example, the following method can be used. It is appropriate to control the crosslinking density of the binder resin by using a compound having two or more reactive functional groups and a compound that is polymerizable by itself as raw materials for the binder resin, and selecting the molecular weights of the binder resin as a raw material. Examples of the binder resin include an epoxy resin, a urethane resin, a urea resin, an ester resin. an amide resin, an imide resin, an amide-imide resin, a phenol resin, a vinyl resin, a silicone resin, and a fluororesin. Of those, an epoxy resin, a urethane resin, a urea resin, an amide resin, or an ester resin is preferred in the present invention because the selection of the binder resin as a raw material allows the production of a binder resin having relatively high flexibility. More preferred is an epoxy resin, a urethane resin, or a urea resin.

Examples of the binder resin as a raw material include, but are not limited to, polyglycidyl compounds, polyamine compounds, polycarboxy compounds, polyisocyanate compounds, polyhydric alcohol compounds, phenol compounds, and vinyl compounds.

The binder resin according to the present invention needs to have an alkylene oxide structure in a molecule thereof. Therefore, the condition 2 can be satisfied, for example, by using, as one of the binder resins as raw materials, an alkylene oxide compound whose alkylene oxide structure is any structure selected from the group consisting of structures represented by the chemical formulae (1)-1 to (1)-3.

Formula (1)-1

$$-\!\!\left[CH_2-CH_2-O\right]_m\!\!-$$

Formula (1)-2

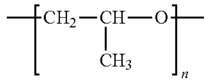

Formula (1)-3

$$-\!\!\left[CH_2-CH_2-CH_2-CH_2-O\right]_p\!\!-$$

In the formulae, m, n, and p each independently represent an integer of 1 or more. It is appropriate to use, as a raw material, an alkylene oxide compound having a glycidyl group, an amino group, a hydroxyl group, or the like at both terminals of each structure. In this case, the selection of the molecular weight of the alkylene oxide structure as a raw material is important. When the value of m, n, or p representing the number of linked units is increased, the intermolecular distance between crosslinked points is enlarged, and as a result, the crosslinking density of the binder resin can be decreased. On the other hand, when the value of m, n, or p is increased too much, the alkylene oxide structure tends to be crystallized. This tendency is conspicuous particularly in the case of a compound having the structure represented by the chemical formula (1)-1. Further, there is a risk in that a crosslinking reaction becomes less likely to occur as a result of a reduction in the number of reactive functional groups contributing to the crosslinking reaction, and an unreacted raw material may increase after the production of the binder resin. For the reasons as described above, the value of m, n, or p is set to preferably 4 to 40, more preferably 6 to 20.

The crosslinking density of the binder resin can be decreased also in raw material resins other than the alkylene oxide compound in the same way by controlling the number of linked units.

For example, also regarding a raw material compound having a siloxane structure, the value of the q in the structure represented by the chemical formula (2) is set to preferably 4 to 40, more preferably 6 to 20. The crosslinking density of the binder resin can be decreased by setting the value of the q to 6 or more. Further, by setting the value of the q to 20 or less, an unreacted raw material compound after the production of the binder resin can be reduced.

It should be noted that, although multiple kinds of raw material compounds including the alkylene oxide compound may be used together as raw materials for the binder resin, it is not necessarily required to increase the number of linked units of all the raw materials as long as the spin-spin relaxation time T2 is 200 μsec or more.

The number of linked units in the binder resin can be estimated, for example, by ionizing a sample through use of matrix-assisted laser desorption/ionization (MALDI) or surface-assisted laser desorption/ionization (SALDI) and performing mass analysis through use of a time-of-flight mass spectrometer (TOF-MS).

The spin-spin relaxation time T2 of the electro-conductive layer can be measured by the following method. The electro-conductive member is left to stand for 3 days or more under the L/L environment, and the electro-conductive layer is cut out from the electro-conductive member. The test piece thus cut out is packed and sealed in a measurement cell under the L/L environment. The measurement cell in which the test piece has been sealed can be measured for the spin-spin relaxation time T2 of the electro-conductive layer through use of a pulse NMR measurement device. It should be noted that, in the present invention, the spin-spin relaxation time T2 with a hydrogen core being a measurement core is measured by a solid echo method. The measurement conditions are as follows: a measurement frequency: 20 MHz, a pulse width: 2.0 μsec, a pulse interval: 12 μsec, and a cumulated number: 128. Regarding a T2 relaxation curve obtained by the pulse NMR measurement, a component having the shortest relaxation time is optimized through use of a Gaussian function and the other components are optimized by a nonlinear least-squares method through use of a Lorenz function, and a weighted average of the respective spin-spin relaxation times T2 is defined as the spin-spin relaxation time T2 according to the present invention.

(Condition 3)

It is important that the binder resin have an alkylene oxide structure in a molecule thereof as means for reducing a resistance value under the L/L environment. The alkylene oxide structure contributes to the ionic dissociation under the L/L environment, and hence, enables the reduction in resistance under the L/L environment.

Specific examples of the alkylene oxide include ethylene oxide, propylene oxide, butylene oxide, and an α-olefin oxide. One kind, or two or more kinds, of those alkylene oxides can be used as required.

From the viewpoint of ionic dissociation, particularly when ethylene oxide out of the alkylene oxides is used, the resistance under the L/L environment can be reduced. However, when the introduction amount of ethylene oxide is large, the water content of the binder resin under the H/H environment increases because ethylene oxide has extremely high hydrophilicity as compared with that of any other alkylene oxide.

By the foregoing reasons, the content of ethylene oxide in the present invention is preferably adjusted so as to fall within the range of 30 mass % or less in the binder resin. Setting the content to 30 mass % or less can suppress the occurrence of abnormal discharge due to a leak resulting from the reduction of the resistance of the binder resin under the H/H environment. The content of ethylene oxide is more preferably 20 mass % or less. As a result of the study by the inventors of the present invention, in many resins, it was confirmed that the resistance value of the binder resin under the H/H environment tends to change greatly between 20 mass % and 30 mass % of the content of the ethylene oxide structure in the binder resin. The reason for this is considered as follows: ethylene oxide forms a continuous phase in the binder resin. From the foregoing result, preferably, when the content of ethylene oxide in the binder resin is 20 mass % or less, an excessive reduction in resistance under the H/H environment can be prevented.

Unlike ethylene oxide, when propylene oxide or butylene oxide is used as the alkylene oxide, even in the case where the content thereof in the binder resin is large, the water content of the binder resin under the H/H environment does not rise greatly. On the other hand, a propylene oxide structure or a butylene oxide structure is preferred as the alkylene oxide structure in the present invention because the propylene oxide structure or the butylene oxide structure sufficiently contributes to the reduction in resistance under the L/L environment. Of those, in particular, the butylene oxide structure has high hydrophobicity compared with that of the propylene oxide structure and also contributes to softening of the binder resin, and hence, the butylene oxide structure is suitable also from the viewpoints of the conditions 1 and 2.

The content of the alkylene oxide in the binder resin in the present invention is preferably 5 mass % or more and 80 mass % or less. More specifically, the content is preferably 10 mass % or more and 60 mass % or less. When the content is 10 mass % or more, the resistance of the resin can be reduced under the L/L environment. When the content is 60 mass % or less, an excessive reduction of the resistance under the H/H environment can be prevented. It should be noted that the term "content of the alkylene oxide" as used herein refers to the total amount of all alkylene oxides such as propylene oxide, butylene oxide, ethylene oxide, and the like.

The kind and content of the alkylene oxide structure in the binder resin can be calculated as described below. Part of the electro-conductive layer is cut out, an extraction operation is performed with a solvent such as ethanol, the resultant extraction residue is subjected to solid $^{13}C$-NMR measurement, and a peak position and an intensity ratio are analyzed. Further, the quantitative determination of the alkylene oxide is additionally facilitated by identifying its molecular structure by infrared spectroscopic (IR) analysis and combining the result with the result of the NMR measurement.

(Linking Group)

It is preferred that the binder resin has a moiety obtained by linking any structure selected from the group consisting of the structures represented by the chemical formulae (1)-1 to (1)-3 and the structure represented by the chemical formula (2) with a linking group including any structure selected from the group consisting of structures represented by the chemical formulae (3)-1 to (3)-7. An epoxy bond or a urethane bond represented by the chemical formulae (3)-1 to (3)-7 has a structure having large polarity, and hence, has an effect of promoting the ionic dissociation. As a result, the resistance value under the L/L environment can be further reduced. Further, it is preferred that the alkylene oxide structure be directly linked to the structures represented by the chemical formulae (3)-1 to (3)-7. In this case, the effect of reducing the resistance value under the L/L environment becomes particularly large.

Formula (3)-1

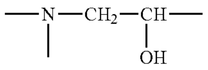

Formula (3)-2

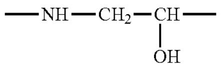

Formula (3)-3

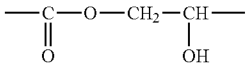

Formula (3)-4

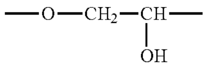

Formula (3)-5

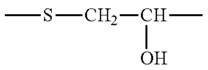

Formula (3)-6

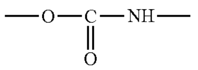

Formula (3)-7

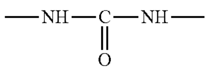

(Condition 4)

It is necessary that the ion exchange group be linked to the binder resin through a chemical bond. The ion exchange group being linked to the binder resin is advantageous for suppressing bleed-out of an ionic electro-conductive agent and suppressing a change in resistance value when a direct current is passed over a long period of time.

The ion exchange group may be introduced into a main chain of the binder resin or a molecular terminal thereof. When the ion exchange group is introduced into a main chain of the binder resin, for example, it is preferred that the ion exchange group be bonded to the binder resin through a linking group including any structure selected from the group consisting of structures represented by the chemical formulae (4)-1 to (4)-3. When the ion exchange group is introduced into a molecular terminal, for example, it is preferred that the molecular terminal include at least one structure selected from the group consisting of structures represented by the chemical formulae (5)-1 to (5)-6. When the ion exchange group is introduced through any such molecular structure, a polar group on the periphery of the ion exchange group promotes the ionic dissociation, and hence, the resistance value under the L/L environment can be further reduced. Further, it is preferred that the ion exchange group be introduced into a molecular terminal of the binder resin from the viewpoint of reducing the resistance under the L/L environment. The reason for this is considered as follows. Compared to the case where the ion exchange group is introduced into a main chain, the molecular mobility of the ion exchange group increases when the ion exchange group is introduced into the molecular terminal.

Formula (4)-1

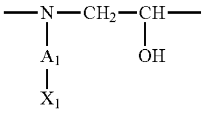

Formula (4)-2

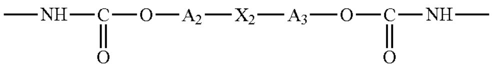

Formula (4)-3

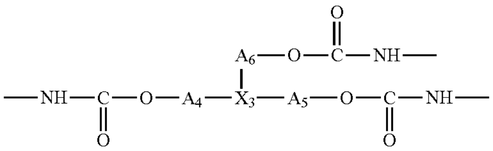

In the formulae, $A_1$ to $A_6$ each independently represent an organic group and $X_1$ to $X_3$ each independently represent an ion exchange group.

Formula (5)-1

$—NH—A_7—X_4$

Formula (5)-2

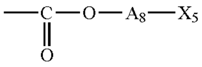

Formula (5)-3

$—O—A_9—X_6$

Formula (5)-4

$—S—A_{10}—X_7$

Formula (5)-5

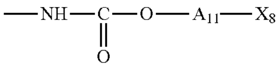

Formula (5)-6

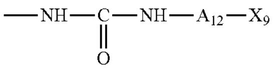

In the formulae, $A_7$ to $A_{12}$ each independently represent an organic group and $X_4$ to $X_9$ each independently represent the ion exchange group.

<Method of Producing Binder Resin>

The binder resin having bonded thereto the ion exchange group through a covalent bond can be produced with, for example, the following raw materials (1) and (2) by the following method.

(1) Ionic Electro-Conductive Agent as Raw Material

The ionic electro-conductive agent as a raw material is an ionic electro-conductive agent having: a reactive functional group that reacts with the binder resin as a raw material; and the ion exchange group that is a sulfo group or a quaternary ammonium group. A desired ion can be introduced as the counter ion by an ion-exchange reaction. It should be noted that examples of the reactive functional group include halogen atoms (fluorine, chlorine, bromine, and iodine atoms), a carboxyl group, an acid group of an acid anhydride or the like, a hydroxyl group, an amino group, an mercapto group, an alkoxyl group, a vinyl group, a glycidyl group, an epoxy group, a nitrile group, and a carbamoyl group, and any of those may be used as long as it reacts with the binder resin as a raw material.

The counter ion can be produced by using an ion exchange reaction between a salt of an ion having a desired chemical structure and an ionic electro-conductive agent (raw material) having a reactive functional group.

For example, when lithium bis(trifluoromethanesulfonyl) imide is used as the salt of an ion and glycidyltrimethylammonium chloride is used as the ionic electro-conductive agent having a reactive functional group, first, each of them is dissolved in purified water. When these two aqueous solutions are mixed and stirred, a chloride ion having high ion exchangeability is substituted with a bis(trifluoromethanesulfonyl)imide ion by an ion exchange reaction. In this case, produced glycidyltrimethylammonium bis(trifluoromethanesulfonyl)imide is an ionic liquid exhibiting hydrophobicity, and hence water-soluble lithium chloride as a by-product can be easily removed. In the case where the reactive ionic electro-conductive agent obtained by the above-mentioned method is hydrophilic, a by-product can be easily removed by using a solvent such as chloroform, dichloromethane, dichloroethane, or methyl isobutyl ketone. Thus, the ionic electro-conductive agent as a raw material of the present invention can be produced.

(2) Binder Resin as Raw Material

The binder resin as a raw material is not particularly limited as long as it reacts with the reactive functional group contained in the ionic electro-conductive agent, and examples thereof include, but are not limited to, a compound having two or more reactive functional groups and a compound that is polymerizable by itself, such as a polyglycidyl compound, a polyamine compound, a polycarboxy compound, a polyisocyanate compound, a polyhydric alcohol compound, a polyisocyanate compound, a phenolic compound, and a vinyl compound.

(3) Production of Binder Resin According to the Present Invention

The binder resin according to the present invention can be produced by causing the ionic electro-conductive agent as a raw material and the binder resin as a raw material to react with each other. The addition amount of the ionic electro-conductive agent as a raw material can be appropriately set, and the ionic electro-conductive agent is preferably blended at a ratio of 0.5 part by mass or more and 20 parts by mass or less with respect to 100 parts by mass of the binder resin as a raw material. When the blending amount is 0.5 part by mass or more, a conductivity-providing effect by the addition of the electro-conductive agent can be easily obtained. When the blending amount is 20 parts by mass or less, the environmental dependence of the resistance value can be reduced.

It should be noted that a method of introducing the counter ion is not limited to the method of producing the resin by using the ionic electro-conductive agent having an ion and, for example, the following method may be adopted. A binder resin is produced with an ionic electro-conductive agent having a proton or a halogen ion, and is then substituted with the ion according to the present invention by ion exchange.

Whether or not the ion exchange group is bonded to the binder resin through a covalent bond can be confirmed by the following method. Part of the electro-conductive layer is cut out, and a Soxhlet extraction operation is performed for 1 week through use of a hydrophilic solvent such as ethanol. The presence or absence of linking of the ion exchange group can be confirmed by performing infrared spectroscopic (IR) analysis with respect to the binder resin after the extraction. Similarly, the kind of the ion exchange group and the amount of the ion exchange group can be determined by subjecting the resultant extract and extraction residue to solid $^{13}$C-NMR measurement and mass spectrometry with a time-of-flight mass spectrometer (TOF-MS).

<Any Other Component>

A filler, a softening agent, a processing aid, a tackifier, an anti-adhesion agent, a dispersant, a foaming agent, a roughness imparting particle, and the like which have been generally used as resin compounding agents can each be added to the electro-conductive layer according to the present invention as long as the effects of the present invention are not impaired.

(Resistance Value of Each Layer)

As a guide, the resistance value of each layer forming the electro-conductive member according to the present invention is $1\times10^3$ Ω·cm or more and $1\times10^9$ Ω·cm or less. In particular, the resistance value of the electro-conductive layer according to the present invention is preferably $1\times10^5$ Ω·cm or more and $1\times10^8$ Ω·cm or less.

When the resistance value of the electro-conductive layer according to the present invention is set to $1\times10^5$ Ω·cm or more, the occurrence of abnormal discharge due to a leak can be suppressed as long as the resistance value of any other layer forming the electro-conductive member is $1\times10^3$ Ω·cm or more and $1\times10^9$ Ω·cm or less. When the resistance value of the electro-conductive layer according to the present invention is set to $1\times10^8$ Ω·cm or less, the occurrence of an image detrimental effect due to an insufficient resistance can be suppressed as long as the resistance value of any other layer forming the electro-conductive member is $1\times10^3$ Ω·cm or more and $1\times10^9$ Ω·cm or less.

(Material for Elastic Layer)

When the electro-conductive layer according to the present invention is used as the surface layer 13 as illustrated in FIG. 1B, a rubber component for forming the elastic layer 12 is not particularly limited and a rubber known in the field of an electro-conductive member for electrophotography can be used. Specific examples thereof include an epichlorohydrin homopolymer, an epichlorohydrin-ethylene oxide copolymer, an epichlorohydrin-ethylene oxide-allylglycidyl ether terpolymer, an acrylonitrile-butadiene copolymer, a hydrogenated product of an acrylonitrile-butadiene copolymer, a silicone rubber, an acrylic rubber, a urethane rubber, and the like.

(Material for Surface Layer)

When the electro-conductive layer according to the present invention is used as the elastic layer 12 as illustrated in FIG. 1B, or used as the intermediate layer 14 as illustrated in FIG. 1C, a resin known in the field of an electro-conductive member for electrophotography can be used for a material for forming the surface layer 13. Specific examples thereof include an acrylic resin, a polyurethane, a polyamide, a polyester, a polyolefin, and a silicone resin. The resin for forming the surface layer may include, as needed, carbon black, graphite, an electro-conductive oxide such as tin oxide, a metal such as copper or silver, electro-conductive particles which obtains conductivity by being covered on its surface with the oxide or metal, or an ionic electro-conductive agent having ion exchange capacity such as a quaternary ammonium salt.

<Process Cartridge and Electrophotographic Apparatus>

The electro-conductive member according to the present invention can be suitably used as, for example, a charging member for abutting on a member to be charged such as a photosensitive member to charge the member to be charged. Further, in a process cartridge which includes a member to be charged and a charging member for charging the member to be charged by coming into contact with the member to be charged to apply a voltage thereto, and which is detachably mountable to the main body of an image forming apparatus, the electro-conductive member according to the present invention can be suitably used as the charging member.

It should be noted that the electro-conductive member according to the present invention can be used as a developing member, a transferring member, a charge-removing member, or a conveying member such as a sheet-feeding roller in addition to the charging member such as a charging roller.

Figure 2:
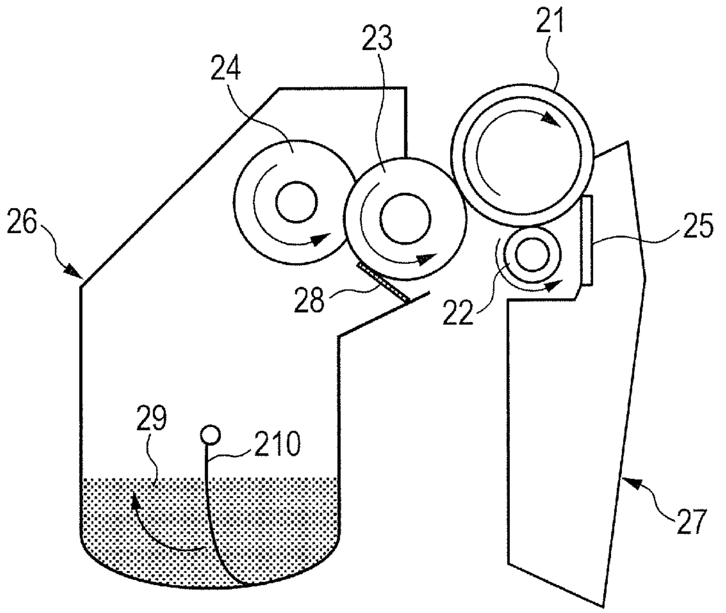
FIG. 2 is an explanatory diagram of a process cartridge according to the present invention.

FIG. 2 is a schematic sectional view of a process cartridge for electrophotography according to the present invention. The process cartridge is formed of one or more of a developing apparatus and a charging apparatus. The developing apparatus is obtained by integrating at least a developing roller 23 and a toner container 26, and may include, as necessary, a toner-supplying roller 24, a toner 29, a developing blade 28, and a stirring blade 210. The charging apparatus is obtained by integrating at least a photosensitive drum 21, a cleaning blade 25, and a charging roller 22, and may include a waste toner container 27. A voltage is applied to each of the charging roller 22, the developing roller 23, the toner-supplying roller 24, and the developing blade 28.

Figure 3:
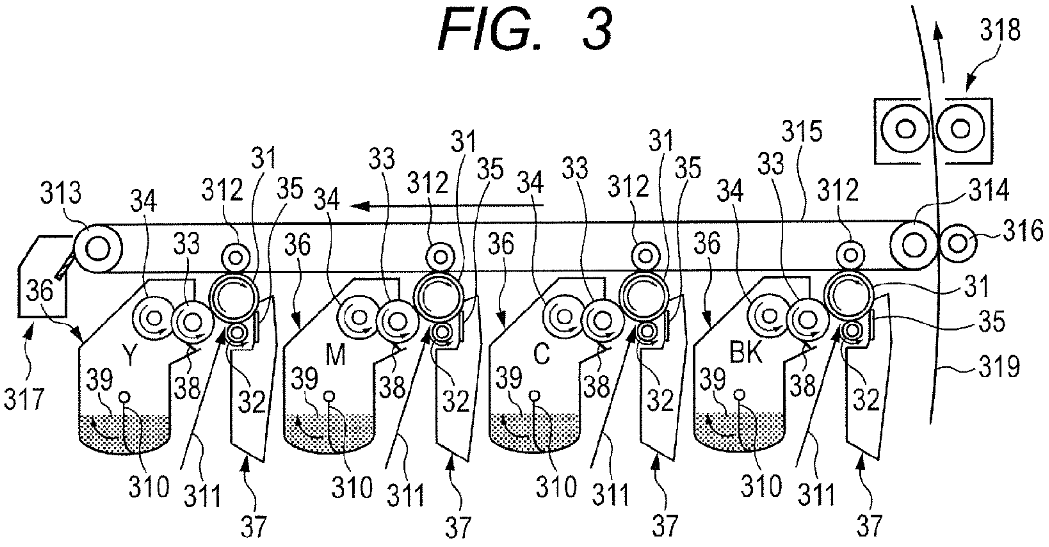
FIG. 3 is an explanatory diagram of an electrophotographic apparatus according to the present invention.

FIG. 3 is a schematic construction view of an electrophotographic apparatus according to the present invention. The electrophotographic apparatus is, for example, the following color image-forming apparatus. The process cartridge illustrated in FIG. 2 is provided for each of toners of respective colors, i.e., black, magenta, yellow, and cyan colors, and the process cartridge is detachably mountable to the apparatus.

A photosensitive drum 31 rotates in a direction indicated by an arrow and is uniformly charged by a charging roller 32 to which a voltage has been applied from a charging bias power source, and an electrostatic latent image is formed on its surface by exposure light 311. Meanwhile, a toner 39 accommodated in a toner container 36 is supplied to a toner-supplying roller 34 by a stirring blade 310 and conveyed onto a developing roller 33. Then, the surface of the developing roller 33 is uniformly coated with the toner 39 by a developing blade 38 placed to be in contact with the developing roller 33, and charge is imparted to the toner 39 by triboelectric charging. The toner 39 conveyed by the developing roller 33 placed to be in contact with the photosensitive drum 31 is applied to the electrostatic latent image to develop the image, which is visualized as a toner image.

The visualized toner image on the photosensitive drum is transferred onto an intermediate transfer belt 315, which is supported and driven by a tension roller 313 and an intermediate transfer belt-driving roller 314, by a primary transfer roller 312 to which a voltage has been applied by a primary transfer bias power source. The toner images of the respective colors are sequentially superimposed to form a color image on the intermediate transfer belt.

A transfer material 319 is fed into the apparatus by a sheet-feeding roller, and is then conveyed into a gap between the intermediate transfer belt 315 and a secondary transfer roller 316. A voltage is applied from a secondary transfer bias power source to the secondary transfer roller 316, and then the roller transfers the color image on the intermediate transfer belt 315 onto the transfer material 319. The transfer material 319 onto which the color image has been transferred is subjected to fixing treatment by a fixing apparatus 318 and then discharged to the outside of the apparatus. Thus, a printing operation is completed.

Meanwhile, the toner remaining on the photosensitive drum without being transferred is scraped off the surface of the photosensitive drum by a cleaning blade 35 and stored in a waste toner-storing container 37. The photosensitive drum that has been cleaned repeatedly performs the foregoing process. The toner remaining on the primary transfer belt without being transferred is also scraped off by a cleaning apparatus 317.

EXAMPLES

The present invention is hereinafter specifically described by way of Examples. It should be noted that Example 43 relates to an electro-conductive member having a construction in which the electro-conductive layer of the present invention is provided on the periphery of the mandrel illustrated in FIG. 1A, and Example 44 relates to an electro-conductive member having a construction in which an elastic layer, an intermediate layer (electro-conductive layer of the present invention), and a protective layer are provided in the stated order on the periphery of the mandrel illustrated in FIG. 1C. Examples and Comparative Examples other than Examples 43 and 44 each relate to an electro-conductive member in which an elastic layer and a surface layer (electro-conductive layer of the present invention) are provided in the stated order on the periphery of the mandrel illustrated in FIG. 1B.

Production Example 1

Production of Elastic Roller

An elastic roller was produced according to the following procedure.

<1-1. Preparation of Unvulcanized Rubber Composition>

An "A-kneading rubber composition 1" was obtained by mixing respective materials whose kinds and amounts were shown in Table 1 below with a pressure kneader. Further, the respective materials whose kinds and amounts were shown in Table 2 below were mixed into 177 parts by mass of the A-kneading rubber composition with an open roll. Thus, an "unvulcanized rubber composition 1" was prepared.

TABLE 1

| | Material | Blending amount (part(s) by mass) |
|---|---|---|
| Raw rubber | NBR (trade name: Nipol DN219, manufactured by ZEON CORPORATION) | 100 |
| Electro-conductive agent | Carbon black (trade name: TOKABLACK #7360SB, manufactured by TOKAI CARBON CO., LTD.) | 40 |
| Filler | Calcium carbonate (trade name: Nanox #30, manufactured by MARUO CALCIUM CO., LTD. | 20 |
| Vulcanization accelerating aid | Zinc oxide | 5 |
| Processing aid | Stearic acid | 1 |

TABLE 2

| | Material | Blending amount (part(s) by mass) |
|---|---|---|
| Crosslinking agent | Sulfur | 1.2 |
| Vulcanization accelerator | Tetrabenzylthiuram disulfide (trade name: TBZTD, manufactured by SANSHIN CHEMICAL INDUSTRY CO., LTD.) | 4.5 |

<1-2. Production of Elastic Roller>

Prepared was a round bar having a total length of 252 mm and an outer diameter of 6 mm obtained by subjecting the surface of free-cutting steel to an electroless nickel plating treatment. Next, an adhesive was applied over the entire periphery of a 230-mm range excluding both end portions of the round bar each having a length of 11 mm. An electro-conductive, hot-melt type adhesive was used as the adhesive. In addition, a roll coater was used in the application. In this example, the round bar to which the adhesive had been applied was used as an electro-conductive mandrel.

Next, a crosshead extruder having a mechanism for supplying the electro-conductive mandrel and a mechanism for discharging an unvulcanized rubber roller was prepared. A die having an inner diameter of 12.5 mm was attached to a crosshead, the temperatures of the extruder and the crosshead were adjusted to 80° C., and the speed at which the electro-conductive mandrel was conveyed was adjusted to 60 mm/sec. Under the conditions, the unvulcanized rubber composition was supplied from the extruder, and then the outer periphery of the electro-conductive mandrel was coated with the unvulcanized rubber composition as an elastic layer in the crosshead to provide an "unvulcanized rubber roller 1." Next, the unvulcanized rubber roller was loaded into a hot-air vulcanization furnace at 170° C. and heated for 60 minutes to provide a "vulcanized rubber roller." After that, the end portions of the elastic layer were cut and removed. Finally, the surface of the elastic layer was ground with grindstone. Thus, an "elastic roller 1" having a diameter at a position distant from its central portion toward each of both end portions by 90 mm of 8.4 mm and a diameter at the central portion of 8.5 mm was obtained.

Production Example 2

Preparation of Coating Liquid

A coating liquid containing a binder resin for forming the electro-conductive layer according to the present invention was prepared according to the following procedure. It should be noted that the binder resin of the present invention is produced from: an ionic electro-conductive agent (I) having a reactive functional group as a raw material; a carrier molecule (II) which is a counter ion of the ionic electro-conductive agent; and a binder resin (III) as a raw material.

<2-1. Preparation of Ionic Electro-Conductive Agent as Raw Material>

8.56 Grams (56.5 mmol) of glycidyltrimethylammonium chloride as an ionic electro-conductive agent (I) having a reactive functional group were dissolved in 50 ml of purified water and then the solution was stirred for 1 hour. Next, 16.22 g (56.5 mmol) of lithium cyclohexafluoropropane-1,3-bis (sulfonyl)imide as a carrier molecule (II) which was a counter ion were dissolved in 50 ml of purified water and then the solution was stirred for 1 hour. Next, those two kinds of aqueous solutions were mixed and then stirred for 2 hours. After the mixing and stirring, the mixture was left at rest overnight. As a result, the mixture separated into two phases, i.e., an aqueous phase in which lithium chloride as a reaction by-product was dissolved as an upper phase liquid and an oil phase formed of glycidyltrimethylammonium bis(trifluoromethanesulfonylimide) as a lower phase liquid. The oil phase was collected with a separating funnel and then lithium chloride remaining in a small amount in the collected oil phase was removed by repeating the washing of the oil phase with purified water twice. An "ionic electro-conductive agent A" having a glycidyl group as a reactive functional group was produced by such method as described above.

<2-2. Preparation of Coating Liquid 1>

0.47 g of the ionic electro-conductive agent, 13.68 g (21.4 mmol) of polypropylene glycol diglycidyl ether (mass-average molecular weight: 640) which was a binder resin (III) as a raw material, and 10.27 g (25.6 mmol) of polypropylene glycol bis(2-aminopropyl ether) (mass-average molecular weight: 400) were dissolved in isopropyl alcohol (IPA), and then the solid content was adjusted to 27 mass %. A "coating liquid 1" was produced as described above.

<2-3. Preparation of Coating Liquids 2 to 45)

Coating liquids 2 to 45 were prepared in the same way as in the coating liquid 1 except for using raw materials shown in Tables 4-1 to 4-9 below. It should be noted that, in Tables 4-1 to 4-9, alphabets described in the columns "Ionic electro-conductive agent containing a reactive group," "Counter ion," and "Binder resin" represent materials shown in Tables 3-1 to 3-3 below, respectively.

TABLE 3-1

| (I) Ionic electro-conductive agent | |
|---|---|
| A | Glycidyltrimethylammonium |
| B | Taurine |
| C | Choline |
| D | Dodecyltrimethylammonium |

TABLE 3-2

| (II) Counter ion | |
|---|---|
| A | Bis(trifluoromethanesulfonyl)imide |
| B | Chlorine |
| C | Perchloric acid |
| D | Bis(nonafluorobutanesulfonyl)imide |
| E | Sodium |
| F | 1-Methyl-3-butylimidazorium |

TABLE 3-3

| (III) Binder resin as raw material | |
|---|---|
| Symbol | Name of substance etc. |
| A | Ethylene glycol diglycidyl ether, Mn = 174 (manufactured by SIGMA-ALDRICH CO. LLC.) |
| B | Polyethylene glycol diglycidyl ether, Mn = 526 (manufactured by SIGMA-ALDRICH CO. LLC.) |
| C | Polyethylene glycol diglycidyl ether (trade name: Denacol EX-841 manufactured by NAGASE CHEMTEX CORPORATION) |
| D | Polypropylene glycol diglycidyl ether, Mn = 380 (manufactured by SIGMA-ALDRICH CO. LLC.) |
| E | Polypropylene glycol diglycidyl ether, Mn = 640 (manufactured by SIGMA-ALDRICH CO. LLC.) |
| F | Polypropylene glycol diglycidyl ether (trade name: Denacol EX-931, manufactured by NAGASE CHEMTEX CORPORATION) |
| G | Polybutylene glycol diglycidyl ether (trade name: EPOGOSEY PT, manufactured by YOKKAICHI CHEMICAL COMPANY, LIMITED) |
| H | Both-terminals epoxy-modified silicone (trade name: KF-105, manufactured by SHIN-ETSU CHEMICAL CO., LTD.) |

TABLE 3-3-continued

| (III) Binder resin as raw material | |
|---|---|
| Symbol | Name of substance etc. |
| I | Ethylene glycol bis(aminoethyl) ether, Mn = 148 (manufactured by SIGMA-ALDRICH CO. LLC.) |
| J | Polypropylene glycol bis(2-aminopropyl) ether, Mn = 400 (manufactured by SIGMA-ALDRICH CO. LLC.) |
| K | Butanediol bis(3-aminopropyl) ether, Mn = 204 (manufactured by SIGMA-ALDRICH CO. LLC.) |
| L | Hexamethylenediamine, Mn = 116 (manufactured by SIGMA-ALDRICH CO. LLC.) |
| M | 1,12-Diaminododecane, Mn = 200 (manufactured by SIGMA-ALDRICH CO. LLC.) |
| N | Both-terminals amino-modified Silicone oil (trade name: KF-8010, manufactured by SHIN-ETSU CHEMICAL CO., LTD.) |
| O | Both-terminals amino-modified silicone oil (trade name: X-22-161A, manufactured by SHIN-ETSU CHEMICAL CO., LTD.) |
| P | Polyoxypropylene polyglyceryl ether (trade name: SC-P750, manufactured by SAKAMOTO YAKUHIN KOGYO CO., LTD.) |
| Q | Polythiol curing agent (trade name: QE-340M, manufactured by TORAY FINE CHEMICALS CO., LTD.) |
| R | Acid anhydride-based curing agent (trade name: RIKACID TMEG-500, manufactured by NEW JAPAN CHEMICAL CO., LTD.) |
| S | Isocyanate curing agent (trade name: Millionate MR-200, manufactured by NIPPON POLYURETHANE INDUSTRY CO., LTD.) |
| T | Polyethylene glycol, Mn = 300 (manufactured by SIGMA-ALDRICH CO. LLC.) |
| U | Polytetramethylene glycol (trade name: PTG1000SN, manufactured by HODOYA CHEMICAL CO., LTD.) |
| V | Both-terminals silanol-modified silicone oil (trade name: X-21-5841, manufactured by SHIN-ETSU CHEMICAL CO., LTD.) |
| W | Pyromellitic dianhydride, Mn = 218 (manufactured by SIGMA-ALDRICH CO. LLC.) |

TABLE 4-1

| Coating liquid No. | 1 | 2 | 3 | 4 | 5 |
|---|---|---|---|---|---|
| (I) Ionic electro-conductive agent containing reactive group | A | A | A | A | A |
| (II) Counter ion | A | A | A | A | A |
| Added amount (part(s) by mass) | 2 | 2 | 2 | 2 | 2 |
| (III) Binder resin raw material | E/J | F/J | G/K | C/F/J | C/F/J |
| Added amount (part(s) by mass) | 69.1/30.9 | 76.7/23.3 | 85.7/14.3 | 69.7/6.6/23.7 | 62.4/13.5/24.1 |
| Structure of binder resin raw material | Formula (1)-2 | Formula (1)-2 | Formula (1)-3 | Formula (1)-1/ Formula (1)-2 | Formula (1)-1/ Formula (1)-2 |
| Kind of binder resin | Epoxy resin | Epoxy resin | Epoxy resin | Epoxy resin | Epoxy resin |
| Structure of bonded portion | Formulae (3)-1 and (3)-2 | Formulae (3)-1 and (3)-2 | Formulae (3)-1 and (3)-2 | Formulae (3)-1 and (3)-2 | Formulae (3)-1 and (3)-2 |
| Content of ethylene oxide (mass %) | 0 | 0 | 0 | 5 | 10 |

TABLE 4-2

| Coating liquid No. | 6 | 7 | 8 | 9 | 10 |
|---|---|---|---|---|---|
| (I) Ionic electro-conductive agent containing reactive group | A | A | A | A | A |
| (II) Counter ion | A | A | A | A | A |
| Added amount (part(s) by mass) | 2 | 2 | 2 | 2 | 2 |
| (III) Binder resin raw material | C/F/J | C/F/J | C/F/J | C/E/J | H/I |
| Added amount (part(s) by mass) | 48.7/26.4/24.9 | 34.6/39.7/25.7 | 20.6/52.8/26.6 | 19.2/52.2/28.6 | 90.0/10.0 |

TABLE 4-2-continued

| Coating liquid No. | 6 | 7 | 8 | 9 | 10 |
|---|---|---|---|---|---|
| Structure of binder resin raw material | Formula (1)-1/ Formula (1)-2 | Formula (1)-1/ Formula (1)-2 | Formula (1)-1/ Formula (1)-2 | Formula (1)-1/ Formula (1)-2 | Formula (1)-1/ Formula (2) |
| Kind of binder resin | Epoxy resin | Epoxy resin | Epoxy resin | Epoxy resin | Epoxy resin |
| Structure of bonded portion | Formulae (3)-1 and (3)-2 | Formulae (3)-1 and (3)-2 | Formulae (3)-1 and (3)-2 | Formulae (3)-1 and (3)-2 | Formulae (3)-1 and (3)-2 |
| Content of ethylene oxide (mass %) | 20 | 30 | 40 | 40 | 6 |

TABLE 4-3

| Coating liquid No. | 11 | 12 | 13 | 14 | 15 |
|---|---|---|---|---|---|
| (I) Ionic electro-conductive agent containing reactive group | A | A | A | A | A |
| (II) Counter ion | A | A | A | A | A |
| Added amount (part(s) by mass) | 2 | 2 | 2 | 2 | 2 |
| (III) Binder resin raw material | F/N | F/O | C/G/N | C/G/N | C/G/N |
| Added amount (part(s) by mass) | 58.6/41.4 | 43.2/56.8 | 51.6/6.5/41.9 | 44.5/13.2/42.3 | 30.6/26.2/43.2 |
| Structure of binder resin raw material | Formula (1)-2/ Formula (2) | Formula (1)-2/ Formula (2) | Formula (1)-1/ Formula (1)-3/ Formula (2) | Formula (1)-1/ Formula (1)-3/ Formula (2) | Formula (1)-1/ Formula (1)-3/ Formula (2) |
| Kind of binder resin | Epoxy resin | Epoxy resin | Epoxy resin | Epoxy resin | Epoxy resin |
| Structure of bonded portion | Formulae (3)-1 and (3)-2 | Formulae (3)-1 and (3)-2 | Formulae (3)-1 and (3)-2 | Formulae (3)-1 and (3)-2 | Formulae (3)-1 and (3)-2 |
| Content of ethylene oxide (mass %) | 0 | 0 | 5 | 10 | 20 |

TABLE 4-4

| Coating liquid No. | 16 | 17 | 18 | 19 | 20 |
|---|---|---|---|---|---|
| (I) Ionic electro-conductive agent containing reactive group | A | A | A | A | A |
| (II) Counter ion | A | A | A | A | A |
| Added amount (part(s) by mass) | 2 | 2 | 2 | 2 | 2 |
| (III) Binder resin raw material | C/G/N | C/G/N | G/L | G/M | C/G/M |
| Added amount (part(s) by mass) | 16.5/39.3/44.2 | 3.2/51.8/45.0 | 91.3/8.7 | 85.9/14.1 | 59.0/26.3/14.7 |
| Structure of binder resin raw material | Formula (1)-1/ Formula (1)-3/ Formula (2) | Formula (1)-1/ Formula (1)-3/ Formula (2) | Formula (1)-3 | Formula (1)-3 | Formula (1)-1/ Formula (1)-3 |
| Kind of binder resin | Epoxy resin | Epoxy resin | Epoxy resin | Epoxy resin | Epoxy resin |
| Structure of bonded portion | Formulae (3)-1 and (3)-2 | Formulae (3)-1 and (3)-2 | Formulae (3)-1 and (3)-2 | Formulae (3)-1 and (3)-2 | Formulae (3)-1 and (3)-2 |
| Content of ethylene oxide (mass %) | 30 | 40 | 0 | 0 | 20 |

TABLE 4-5

| Coating liquid No. | 21 | 22 | 23 | 24 | 25 |
|---|---|---|---|---|---|
| (I) Ionic electro-conductive agent containing reactive group | A | A | A | A | A |
| (II) Counter ion | A | A | A | A | B |
| Added amount (part(s) by mass) | 2 | 1 | 4 | 8 | 2 |
| (III) Binder resin raw material | C/G/M | F/N | F/N | F/N | F/N |

TABLE 4-5-continued

| Coating liquid No. | 21 | 22 | 23 | 24 | 25 |
|---|---|---|---|---|---|
| Added amount (part(s) by mass) | 45.8/39.2/15.0 | 58.6/41.4 | 58.6/41.4 | 58.6/41.4 | 58.6/41.4 |
| Structure of binder resin raw material | Formula (1)-1/ Formula (1)-3 | Formula (1)-2/ Formula (2) | Formula (1)-2/ Formula (2) | Formula (1)-2/ Formula (2) | Formula (1)-2/ Formula (2) |
| Kind of binder resin | Epoxy resin | Epoxy resin | Epoxy resin | Epoxy resin | Epoxy resin |
| Structure of bonded portion | Formulae (3)-1 and (3)-2 | Formulae (3)-1 and (3)-2 | Formulae (3)-1 and (3)-2 | Formulae (3)-1 and (3)-2 | Formulae (3)-1 and (3)-2 |
| Content of ethylene oxide (mass %) | 30 | 0 | 0 | 0 | 0 |

TABLE 4-6

| Coating liquid No. | 26 | 27 | 28 | 29 | 30 |
|---|---|---|---|---|---|
| (I) Ionic electro-conductive agent containing reactive group | A | A | B | B | A |
| (II) Counter ion | C | D | E | F | A |
| Added amount (part(s) by mass) | 2 | 2 | 2 | 2 | 2 |
| (III) Binder resin raw material | F/N | F/N | F/N | F/N | G/P |
| Added amount (part(s) by mass) | 58.6/41.4 | 58.6/41.4 | 58.6/41.4 | 58.6/41.4 | 88.0/12.0 |
| Structure of binder resin raw material | Formula (1)-2/ Formula (2) | Formula (1)-2/ Formula (2) | Formula (1)-2/ Formula (2) | Formula (1)-2/ Formula (2) | Formula (1)-2/ Formula (1)-3 |
| Kind of binder resin | Epoxy resin | Epoxy resin | Epoxy resin | Epoxy resin | Epoxy resin |
| Structure of bonded portion | Formulae (3)-1 and (3)-2 | Formulae (3)-1 and (3)-2 | Formulae (3)-1 and (3)-2 | Formulae (3)-1 and (3)-2 | Formula (3)-4 |
| Content of ethylene oxide (mass %) | 0 | 0 | 0 | 0 | 0 |

TABLE 4-7

| Coating liquid No. | 31 | 32 | 33 | 34 | 35 |
|---|---|---|---|---|---|
| (I) Ionic electro-conductive agent containing reactive group | A | A | C | C | C |
| (II) Counter ion | A | A | A | A | A |
| Added amount (part(s) by mass) | 2 | 2 | 2 | 2 | 2 |
| (III) Binder resin raw material | G/Q | G/R | S/U | S/T/U | S/T/U |
| Added amount (part(s) by mass) | 77.6/22.3 | 74.8/25.2 | 45.5/64.5 | 45.5/20.0/34.5 | 45.5/30.0/25.5 |
| Structure of binder resin raw material | Formula (1)-3 | Formula (1)-3 | Formula (1)-3 | Formula (1)-1/ Formula (1)-3 | Formula (1)-1/ Formula (1)-3 |
| Kind of binder resin | Epoxy resin | Epoxy resin | Urethane resin | Urethane resin | Urethane resin |
| Structure of bonded portion | Formula (3)-5 | Formula (3)-3 | Formula (3)-6 | Formula (3)-6 | Formula (3)-6 |
| Content of ethylene oxide (mass %) | 0 | 0 | 0 | 20 | 30 |

TABLE 4-8

| Coating liquid No. | 36 | 37 | 38 | 39 | 40 |
|---|---|---|---|---|---|
| (I) Ionic electro-conductive agent containing reactive group | C | C | C | C | C |

TABLE 4-8-continued

| Coating liquid No. | 36 | 37 | 38 | 39 | 40 |
|---|---|---|---|---|---|
| (II) Counter ion | A | A | A | A | A |
| Added amount (part(s) by mass) | 2 | 2 | 2 | 2 | 2 |
| (III) Binder resin raw material | S/T/U | J/N/S | S/T/V | S/T/V | P/U/W |
| Added amount (part(s) by mass) | 45.5/40.0/14.5 | 30/24.5/45.5 | 45.5/20.0/34.5 | 45.5/30.0/25.5 | 11.5/61.6/26.9 |
| Structure of binder resin raw material | Formula (1)-1/ Formula (1)-3 | Formula (1)-2/ Formula (2) | Formula (1)-1/ Formula (2) | Formula (1)-1/ Formula (2) | Formula (1)-2/ Formula (1)-3 |
| Kind of binder resin | Urethane resin | urea resin | Urethane resin | Urethane resin | Ester resin |
| Structure of bonded portion | Formula (3)-6 | Formula (3)-7 | Formula (3)-6 | Formula (3)-6 | — |
| Content of ethylene oxide (mass %) | 40 | 0 | 20 | 30 | 0 |

TABLE 4-9

| Coating liquid No. | 41 | 42 | 43 | 44 | 45 |
|---|---|---|---|---|---|
| (I) Ionic electro-conductive agent containing reactive group | A | A | A | D | A |
| (II) Counter ion | A | A | A | B | A |
| Added amount (part(s) by mass) | 2 | 2 | 2 | 2 | 2 |
| (III) Binder resin raw material | D/J | C/I | A/B/I | H/J | H/N |
| Added amount (part(s) by mass) | 57.1/42.9 | 87.5/12.5 | 46.3/27.6/26.1 | 90.0/10.0 | 61.0/39.0 |
| Structure of binder resin raw material | Formula (1)-2 | Formula (1)-1 | Formula (1)-1 | Formula (1)-2/ Formula (2) | Formula (2) |
| Kind of binder resin | Epoxy resin | Epoxy resin | Epoxy resin | Epoxy resin | Epoxy resin |
| Structure of bonded portion | Formulae (3)-1 and (3)-2 | Formulae (3)-1 and (3)-2 | Formulae (3)-1 and (3)-2 | Formulae (3)-1 and (3)-2 | Formulae (3)-1 and (3)-2 |
| Content of ethylene oxide (mass %) | 0 | 75 | 70 | 6 | 0 |

Example 1

1. Production of Electro-Conductive Roller 1

The elastic roller 1 obtained in Production Example 1 was coated with the coating liquid 1 obtained in Production Example 2 by a dipping method involving immersing the roller in the liquid with its longitudinal direction defined as a vertical direction. An immersion time was set to 9 seconds, an initial lifting speed was set to 20 mm/s, a final lifting speed was set to 2 mm/s, and a speed was linearly changed with time between the initial and final speeds. The resultant coated product was air-dried at 23° C. for 30 minutes. Next, the product was dried with a hot air-circulating dryer set to 90° C. for 1 hour. Further, the product was dried with a hot air-circulating dryer set to 160° C. for 3 hours. Thus, an electro-conductive layer was formed on the outer peripheral surface of the elastic roller 1. As a result, a “electro-conductive roller 1” was produced.

2. Characteristic Evaluation

Next, the electro-conductive roller 1 was subjected to the following evaluation tests. Table 5-1 shows the results of the evaluations.

(Evaluation 1: Measurement of Resistance of Electro-Conductive Layer)

The electrical resistivity of the electro-conductive layer was calculated by performing alternating-current impedance measurement according to a four-probe method. The measurement was performed at an applied voltage of 50 mV in the measurement frequency range of 1 Hz to 1 MHz. As a four-probe, MCT-TP06P manufactured by Mitsubishi Chemical Corporation was used. A probe interval was set to 4.5 mm. The measurement was performed under the L/L (temperature: 15° C./relative humidity: 10%) environment and the H/H (temperature: 30° C./relative humidity: 80%) environment. Further, in order for the influence of an environmental variation to be confirmed, the logarithm of a ratio (R1/R2) of an electrical resistivity R1 under the L/L environment to an electrical resistivity R2 under the H/H environment was determined and defined as an environmental variation digit. It should be noted that the electro-conductive roller was left to stand under each environment for 48 hours or more.

When the electro-conductive layer according to the present invention was an outermost surface layer of the electro-conductive roller (in the cases of this example, and Examples 2 to 43, 45, and 46 and Comparative Examples 1 to 5 described later), the four-probe was pressed against a roller surface so as to be in parallel to a cored bar to measure an electrical resistivity. It should be noted that an electrical resistivity was measured five times and expressed as an average value of the five measured values. On the other hand, when the electro-conductive layer according to the present invention was an intermediate layer (in the case of Example 44 described later), an outermost surface layer was removed through use of a razor to expose an intermediate layer, and thereafter, the four-probe was pressed against a roller surface to measure an electrical resistivity in the same way as described above.

(Evaluation 2: Bleeding Test)

Figure 4A:
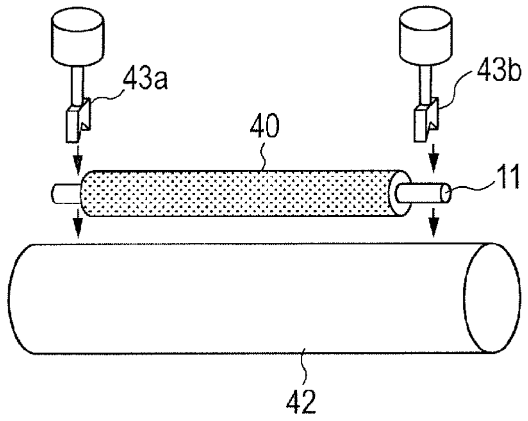
FIG. 4A is an explanatory diagram of an apparatus for applying a direct-current voltage to an electro-conductive member and measuring a current.
Figure 4B:
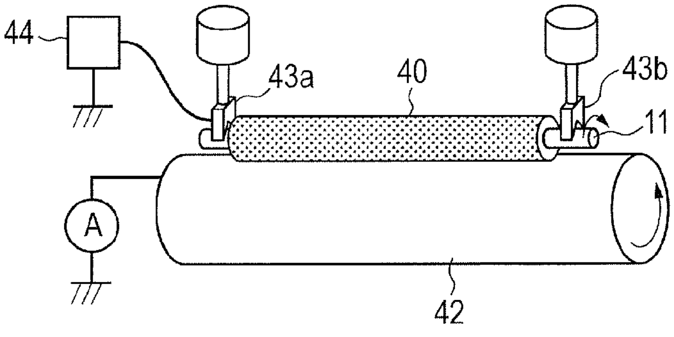
FIG. 4B is an explanatory diagram of an apparatus for applying a direct-current voltage to an electro-conductive member and measuring a current.

Next, a bleeding test was performed through use of an instrument for measuring a current illustrated in FIGS. 4A and 4B. In FIGS. 4A and 4B, a photosensitive drum having a diameter of 24 mm was set in place of a columnar metal 42. The photosensitive drum was obtained by taking apart a process cartridge for an electrophotographic laser printer (trade name: Laserjet CP4525dn manufactured by Hewlett-Packard Company). Then, an electro-conductive roller was brought into abutment with the photosensitive drum under a load pressing both ends (one side: 500 gf) of a mandrel 11 in a vertical direction under an environment of a temperature of 40° C./relative humidity of 95%, and the electro-conductive roller was left to stand for 2 weeks without being rotated. After that, the surface of the photosensitive drum was observed with an optical microscope (magnification: 10). The presence or absence of the adhesion of a product bleeding from the electro-conductive roller and the presence or absence of a crack in the surface of the photosensitive drum were observed, and an evaluation was performed based on the following criteria.

A: No adhesion of any bleeding product on the surface of the abutting portion of the photosensitive drum is observed.

B: The adhesion of a slight bleeding product on the part of the surface of the abutting portion of the photosensitive drum is observed.

C: The adhesion of a slight bleeding product on the entire surface of the abutting portion of the photosensitive drum is observed.

D: A bleeding product and a crack are observed on the surface of the abutting portion of the photosensitive drum.

(Evaluation 3: Evaluation for Water Content of Electro-Conductive Layer)

For measuring a water content of the electro-conductive layer, a Karl Fischer Moisture Titrator (trade name: MKC-510N) manufactured by KYOTO ELECTRONICS MANUFACTURING CO., LTD. was used. The electro-conductive layer of an electro-conductive roller left to stand for 48 hours under the H/H environment was shaved off by 0.1 g and sealed in a measurement cell, and thereafter, a water content was measured.

(Evaluation 4: Evaluation for Relaxation Time T2 of Electro-Conductive Layer)

For measuring a spin-spin relaxation time T2 of the electro-conductive layer, a pulse NMR device (trade name: MU25A) manufactured by JEOL Ltd. was used. The electro-conductive layer of an electro-conductive roller left to stand for 48 hours under the L/L environment was shaved off by 0.5 g and sealed in a measurement cell, and thereafter, a relaxation time T2 was measured. For the measurement, the value of the relaxation time T2 was determined from an echo intensity obtained through use of a solid echo method with a hydrogen core being a measurement core by pulse NMR measurement. Conditions for the measurement were as follows: measurement frequency: 20 MHz; 90° pulse width: 2.0 μsec; pulse interval: 12 μsec; temperature: 15° C.; and cumulative number: 128.

3. Image Evaluation

Next, the electro-conductive roller was subjected to the following evaluation tests. Table 5-1 shows the results of the evaluations.

(Evaluation 5: Pinhole Leak Test)

In order to confirm the effect of suppressing an excessive reduction in resistance under the H/H environment of an electro-conductive roller, the electro-conductive roller was incorporated as a charging roller into an electrophotographic apparatus, and the following image evaluation was performed. First, the electro-conductive roller was left to stand under the H/H environment for 72 hours or more. Next, a product obtained by reconstructing an electrophotographic laser printer (trade name: Laserjet CP4525dn, manufactured by Hewlett-Packard Company) so as to output A4-size paper at a high speed of 50 sheets/min was prepared as an electrophotographic apparatus. In that case, the speed at which a recording medium was output was set to 300 mm/sec and an image resolution was set to 1,200 dpi. Next, a photosensitive drum was taken out of a process cartridge of the electrophotographic apparatus, and then only a charge transport layer on the surface of the photosensitive drum was perforated with a pinhole having a diameter of 0.3 mm in a direction perpendicular to the surface.

The electro-conductive roller (charging roller) and the photosensitive drum having the pinhole were incorporated into the process cartridge of the electrophotographic apparatus. Further, an external power source (trade name: Trek 615-3, manufactured by Trek) was prepared and then an image evaluation was performed by applying a direct-current voltage of −1,500 V to the charging roller. The entire image evaluation was performed under the H/H environment, and was performed by outputting five halftone images (images in each of which horizontal lines each having a width of 1 dot were drawn in a direction perpendicular to the rotation direction of the photosensitive member at an interval of 2 dots). At this time, the case where an image density along a line horizontal to the image output direction from the position of the pinhole on the photosensitive drum significantly differed from that around the line was judged to be the case where an image failure called a pinhole leak occurred. The resultant images were evaluated by the following criteria.

A: No pinhole leak is observed in each of the five images.

B: One to three pinhole leaks occur in each of the five images.

C: Pinhole leaks occur in each of the five images in synchronization with the cycle of the photosensitive drum.

(Evaluation 6: Evaluation for Horizontal Streak-Like Image Defect)

The following evaluation was performed for confirming a suppressing effect on a deterioration in resistance value when the electro-conductive roller was used for a long time period and a reducing effect on the resistance value under the L/L environment.

(1) Passage of Direct Current

Through use of a jig illustrated in FIGS. 4A and 4B, a load (one side: 500 gf) was applied to each of both ends of an electro-conductive support 11 of an electro-conductive roller 40 to bring the electro-conductive roller 40 into abutment with the columnar metal 42 having a diameter of 24 mm and a direct current was passed therethrough. In FIG. 4A, reference symbols 43*a* and 43*b* each represent a bearing fixed to a deadweight, and the columnar metal 42 is positioned vertically downward the electro-conductive roller 40 so as to be parallel to the electro-conductive roller 40. The electro-conductive roller 40 was left to stand for 48 hours under the L/L environment. Then, while the columnar metal 42 was rotated at the same rotational speed (30 rpm) as that of the photosensitive drum in use by a drive apparatus (not shown) under the L/L environment, the electro-conductive roller 40 was pressed against the columnar metal 42 as illustrated in FIG. 4B. Then, a direct current of 200 μA was passed for minutes by a power source 44. Then, the electro-conductive roller after the passage of the direct current was subjected to an image evaluation test according to the following item (2).

(2) Image Evaluation Test

Prepared as an electrophotographic apparatus was an electrophotographic laser printer (trade name: Laserjet CP4525dn, manufactured by Hewlett-Packard Company) reconstructed so as to output A4-size paper at a high speed of 50 sheets/min. At that time, the speed at which a recording medium was output was set to 300 mm/sec and an image resolution was set to 1,200 dpi. The electro-conductive roller after the passage of the direct current in the item (1) was incorporated as a charging roller into a process cartridge for the electrophotographic apparatus. The process cartridge was mounted on the electrophotographic apparatus, and a half-tone image was formed as an electrophotographic image. Then half-tone image refers to an image in which horizontal lines each having a width of 1 dot were drawn in a direction perpendicular to the rotation direction of a photosensitive drum at an interval of 2 dots. An electrophotographic image was formed and evaluated under the L/L environment. The thus obtained electrophotographic image was observed visually and evaluated based on the following criteria.

A: No horizontal streak is observed.

B: A slight, horizontal streak-like white line is observed in part of the electrophotographic image.

C: A slight, horizontal streak-like white line is observed in the entire surface of the electrophotographic image.

D: A conspicuous, horizontal streak-like white line is observed in the entire surface of the electrophotographic image.

(Evaluation 7: Measurement of Discharge Current Amount Needed for Disappearance of Image Defect)

In order to confirm the effect of reducing a discharge current amount by suppression of an excessive reduction in resistance under the H/H environment of an electro-conductive roller, the electro-conductive roller was incorporated as a charging roller into an electrophotographic apparatus, and the following image test was performed.

An electrophotographic laser printer based on the AC/DC charging system (trade name: Laserjet 4515n, manufactured by Hewlett-Packard Company) was prepared as an electrophotographic apparatus. It should be noted that the speed at which the laser printer outputs a recording medium is 370 mm/sec and its image resolution is 1,200 dpi. In addition, a charging roller-holding member in a process cartridge of the electrophotographic apparatus was replaced with a reconstructed holding member longer than the holding member by 3.5 mm so that the electro-conductive roller having an outer diameter of 8.5 mm could be incorporated.

In the measurement of a discharge current amount, the laser printer was reconstructed, an earth current flowing from a photosensitive drum to the earth was measured, and the discharge current amount was calculated from the earth current. A method for the foregoing is described below. First, conduction from the photosensitive drum to the main body of the laser printer was blocked, the photosensitive drum and a metal thin-film resistor (1 kΩ) outside the laser printer were connected in series with a lead, and the metal thin-film resistor was connected to the earth of the laser printer. Next, a DC voltage and an AC voltage were applied to the charging roller while being superimposed, and a true effective value for the waveform of a voltage across the metal thin-film resistor that was able to be measured with a digital multimeter (trade name: FLUKE 87V, manufactured by FLUKE) was defined as an earth current amount.

When the earth current amount is plotted against the AC voltage (Vpp), an AC current flows through a nip portion as a portion of contact between the charging roller and the photosensitive drum at low Vpp, and hence the earth current amount linearly increases. When the Vpp increases and discharge is caused by an AC voltage component, the earth current is measured in a state where a discharge current is superimposed thereon. Therefore, the plot of the earth current increases from the linear plot in the low-Vpp region by the amount of the discharge current. That is, the discharge current amount can be plotted against the Vpp by subtracting a straight line obtained by extending the graph of the plot in the low-Vpp region toward high Vpp from the plot of the earth current.

First, the electro-conductive roller was left to stand under the H/H environment for 48 hours or more. The electro-conductive roller was incorporated as a charging roller into a process cartridge for the electrophotographic apparatus. Then, the process cartridge was mounted on the electrophotographic apparatus and then an electrophotographic image was formed.

First, an electrophotographic image was output by applying a DC voltage of −600 V and an AC voltage of 900 Vpp (having a frequency of 2,931 Hz) to the charging roller under the H/H environment. The electrophotographic image was observed visually, and the occurrence of spot-like black dots was confirmed. Then, when spot-like black dots were formed, an AC applied voltage was increased by 10 V to form an electrophotographic image, and whether or not spot-like black dots were formed in the thus obtained image was observed. Then, the following operation was repeated: an AC applied voltage was increased in increments of 10 V to form an electrophotographic image until an electrophotographic image in which spot-like black dots were not formed was obtained; and the occurrence of the spot-like black dots of the obtained image was observed. Then, an applied AC voltage when an electrophotographic image in which the occurrence of spot-like black dots was not observed was obtained was defined as an image defect-disappearing voltage. In addition, a discharge current amount calculated from an earth current under such a condition that the image defect-disappearing voltage was applied was defined as an image defect-disappearing discharge current amount. It should be noted that, as the image defect-disappearing discharge current amount is smaller, the surface of the photosensitive drum is damaged less, with the result that the lifetime of the photosensitive drum can be extended.

Examples 2 to 40

Electro-conductive rollers 2 to 40 were produced and evaluated in the same way as in Example 1 except for using the elastic roller 1 produced by the same method as that of Example 1 and changing the coating liquid to each coating liquid shown in Tables 5-1 to 5-8. Tables 5-1 to 5-8 show the results of the evaluations. A fluctuation in resistance value of the elastic layer in each of the examples having the same formation conditions for forming the elastic layer is a fluctuation due to a variation in production lot.

TABLE 5-1

| | Example 1 | Example 2 | Example 3 | Example 4 | Example 5 |
|---|---|---|---|---|---|
| Elastic layer | NBR | NBR | NBR | NBR | NBR |
| Surface layer coating liquid No. | Coating liquid 1 | Coating liquid 2 | Coating liquid 3 | Coating liquid 4 | Coating liquid 5 |
| Surface layer film thickness (μm) | 10 | 12 | 11 | 10 | 10 |
| Characteristic evaluation | | | | | |
| Elastic layer resistance (Ω · cm) L/L | 2.11E+05 | 3.15E+05 | 9.91E+04 | 1.50E+05 | 1.11E+05 |
| Elastic layer resistance (Ω · cm) H/H | 2.33E+05 | 3.31E+05 | 9.93E+04 | 1.67E+05 | 1.21E+05 |
| Surface layer resistance (Ω · cm) L/L | 4.05E+07 | 1.87E+07 | 1.16E+07 | 1.20E+07 | 7.11E+06 |
| Surface layer resistance (Ω · cm) H/H | 1.21E+06 | 9.32E+05 | 7.30E+05 | 6.42E+05 | 4.88E+05 |
| Environmental variation digit (surface layer) | 1.52 | 1.30 | 1.20 | 1.27 | 1.16 |
| Water content (mass %) | 2.45 | 2.33 | 2.11 | 3.71 | 4.56 |
| Relaxation time T2 (μsec) | 212 | 368 | 463 | 568 | 646 |
| Bleed evaluation | A | A | A | A | A |
| Image evaluation | | | | | |
| Pinhole leak evaluation | A | A | A | A | A |
| Horizontal streak evaluation | C | B | A | A | A |
| Discharge current amount (μA) | 35 | 41 | 44 | 49 | 55 |

TABLE 5-2

| | Example 6 | Example 7 | Example 8 | Example 9 | Example 10 |
|---|---|---|---|---|---|
| Elastic layer | NBR | NBR | NBR | NBR | NBR |
| Surface layer coating liquid No. | Coating liquid 6 | Coating liquid 7 | Coating liquid 8 | Coating liquid 9 | Coating liquid 10 |
| Surface layer film thickness (μm) | 12 | 13 | 11 | 10 | 14 |
| Characteristic evaluation | | | | | |
| Elastic layer resistance (Ω · cm) L/L | 3.13E+05 | 2.87E+05 | 2.08E+05 | 4.51E+05 | 5.10E+05 |
| Elastic layer resistance (Ω · cm) H/H | 3.37E+05 | 2.91E+05 | 2.14E+05 | 4.60E+05 | 5.19E+05 |
| Surface layer resistance (Ω · cm) L/L | 5.53E+06 | 4.80E+06 | 4.41E+06 | 8.33E+06 | 4.69E+07 |
| Surface layer resistance (Ω · cm) H/H | 4.05E+05 | 2.00E+05 | 1.33E+05 | 1.21E+05 | 3.26E+06 |
| Environmental variation digit (surface layer) | 1.14 | 1.38 | 1.52 | 1.84 | 1.16 |
| Water content (mass %) | 5.26 | 7.73 | 9.89 | 9.97 | 1.47 |
| Relaxation time T2 (μsec) | 703 | 919 | 1,052 | 225 | 238 |
| Bleed evaluation | A | B | B | B | A |
| Image evaluation | | | | | |
| Pinhole leak evaluation | A | A | A | A | A |
| Horizontal streak evaluation | A | A | A | A | C |
| Discharge current amount (μA) | 58 | 62 | 63 | 65 | 32 |

TABLE 5-3

| | Example 11 | Example 12 | Example 13 | Example 14 | Example 15 |
|---|---|---|---|---|---|
| Elastic layer | NBR | NBR | NBR | NBR | NBR |
| Surface layer coating liquid No. | Coating liquid 11 | Coating liquid 12 | Coating liquid 13 | Coating liquid 14 | Coating liquid 15 |
| Surface layer film thickness (μm) | 27 | 15 | 14 | 16 | 14 |
| Characteristic evaluation | | | | | |
| Elastic layer resistance (Ω · cm) L/L | 3.11E+05 | 2.86E+05 | 1.08E+05 | 2.55E+05 | 3.91E+05 |
| Elastic layer resistance (Ω · cm) H/H | 3.33E+05 | 2.97E+05 | 1.16E+05 | 2.68E+05 | 4.01E+05 |
| Surface layer resistance (Ω · cm) L/L | 2.33E+07 | 1.01E+07 | 8.37E+06 | 7.65E+06 | 5.13E+06 |
| Surface layer resistance (Ω · cm) H/H | 2.10E+06 | 1.10E+06 | 6.99E+05 | 5.17E+05 | 4.23E+05 |
| Environmental variation digit (surface layer) | 1.05 | 0.96 | 1.08 | 1.17 | 1.08 |
| Water content (wt %) | 0.94 | 0.76 | 1.37 | 2.55 | 3.81 |
| Relaxation time T2 (μsec) | 493 | 781 | 959 | 1,117 | 1,294 |
| Bleed evaluation | A | A | A | A | A |
| Image evaluation | | | | | |
| Pinhole leak evaluation | A | A | A | A | A |
| Horizontal streak evaluation | A | A | A | A | A |
| Discharge current amount (μA) | 30 | 35 | 37 | 46 | 55 |

TABLE 5-4

| | Example 16 | Example 17 | Example 18 | Example 19 | Example 20 |
|---|---|---|---|---|---|
| Elastic layer | NBR | NBR | NBR | NBR | NBR |
| Surface layer coating liquid No. | Coating liquid 16 | Coating liquid 17 | Coating liquid 18 | Coating liquid 19 | Coating liquid 20 |
| Surface layer film thickness (μm) | 15 | 16 | 7 | 5 | 6 |
| Characteristic evaluation | | | | | |
| Elastic layer resistance (Ω · cm) L/L | 1.74E+05 | 1.56E+05 | 8.11E+04 | 7.13E+04 | 9.97E+04 |
| Elastic layer resistance (Ω · cm) H/H | 1.84E+05 | 1.68E+05 | 8.32E+04 | 7.31E+04 | 1.08E+05 |
| Surface layer resistance (Ω · cm) L/L | 3.06E+06 | 2.53E+06 | 5.76E+07 | 4.76E+07 | 9.24E+06 |
| Surface layer resistance (Ω · cm) H/H | 8.20E+04 | 6.11E+04 | 2.50E+06 | 1.87E+06 | 2.33E+05 |
| Environmental variation digit (surface layer) | 1.57 | 1.62 | 1.36 | 1.41 | 1.60 |
| Water content (wt %) | 5.77 | 7.64 | 1.83 | 1.69 | 4.92 |
| Relaxation time T2 (μsec) | 1,451 | 1,531 | 208 | 319 | 697 |
| Bleed evaluation | B | B | A | A | A |
| Image evaluation | | | | | |
| Pinhole leak evaluation | A | A | A | A | A |
| Horizontal streak evaluation | A | A | C | C | A |
| Discharge current amount (μA) | 70 | 72 | 46 | 39 | 69 |

TABLE 5-5

| | Example 21 | Example 22 | Example 23 | Example 24 | Example 25 |
|---|---|---|---|---|---|
| Elastic layer | NBR | NBR | NBR | NBR | NBR |
| Surface layer coating liquid No. | Coating liquid 21 | Coating liquid 22 | Coating liquid 23 | Coating liquid 24 | Coating liquid 25 |
| Surface layer film thickness (μm) | 6 | 13 | 16 | 15 | 15 |
| Characteristic evaluation | | | | | |
| Elastic layer resistance (Ω · cm) L/L | 1.31E+05 | 2.11E+05 | 1.64E+05 | 3.09E+05 | 2.61E+05 |
| Elastic layer resistance (Ω · cm) H/H | 1.46E+05 | 2.25E+05 | 1.77E+05 | 3.20E+05 | 2.81E+05 |
| Surface layer resistance (Ω · cm) L/L | 8.26E+06 | 1.74E+07 | 6.05E+06 | 3.96E+06 | 1.51E+07 |
| Surface layer resistance (Ω · cm) H/H | 1.47E+05 | 2.21E+06 | 5.97E+05 | 2.43E+05 | 1.05E+06 |
| Environmental variation digit (surface layer) | 1.75 | 0.90 | 1.01 | 1.21 | 1.16 |
| Water content (mass %) | 6.38 | 0.51 | 0.53 | 0.57 | 0.88 |
| Relaxation time T2 (μsec) | 891 | 807 | 757 | 721 | 806 |
| Bleed evaluation | B | A | A | B | B |
| Image evaluation | | | | | |
| Pinhole leak evaluation | A | A | A | A | A |
| Horizontal streak evaluation | A | B | A | A | B |
| Discharge current amount (μA) | 77 | 32 | 43 | 57 | 36 |

TABLE 5-6

| | Example 26 | Example 27 | Example 28 | Example 29 | Example 30 |
|---|---|---|---|---|---|
| Elastic layer | NBR | NBR | NBR | NBR | NBR |
| Surface layer coating liquid No. | Coating liquid 26 | Coating liquid 27 | Coating liquid 28 | Coating liquid 29 | Coating liquid 30 |
| Surface layer film thickness (μm) | 16 | 15 | 14 | 13 | 63 |
| Characteristic evaluation | | | | | |
| Elastic layer resistance (Ω · cm) L/L | 1.40E+05 | 9.19E+04 | 1.66E+04 | 7.09E+04 | 6.19E+04 |
| Elastic layer resistance (Ω · cm) H/H | 1.61E+05 | 9.99E+04 | 1.81E+04 | 7.33E+04 | 6.31E+04 |
| Surface layer resistance (Ω · cm) L/L | 1.41E+07 | 1.51E+07 | 1.87E+07 | 1.08E+07 | 6.16E+06 |
| Surface layer resistance (Ω · cm) H/H | 1.33E+06 | 2.01E+06 | 8.54E+05 | 9.11E+05 | 9.33E+04 |
| Environmental variation digit (surface layer) | 1.03 | 0.88 | 1.34 | 1.07 | 1.82 |
| Water content (mass %) | 0.76 | 0.46 | 1.15 | 1.09 | 4.81 |
| Relaxation time T2 (μsec) | 771 | 755 | 851 | 769 | 451 |
| Bleed evaluation | A | A | B | A | B |
| Image evaluation | | | | | |
| Pinhole leak evaluation | A | A | A | A | A |
| Horizontal streak evaluation | A | A | B | A | B |
| Discharge current amount (μA) | 35 | 33 | 39 | 36 | 73 |

TABLE 5-7

| | Example 31 | Example 32 | Example 33 | Example 34 | Example 35 |
|---|---|---|---|---|---|
| Elastic layer | NBR | NBR | NBR | NBR | NBR |
| Surface layer coating liquid No. | Coating liquid 31 | Coating liquid 32 | Coating liquid 33 | Coating liquid 34 | Coating liquid 35 |
| Surface layer film thickness (μm) | 51 | 73 | 30 | 36 | 31 |
| Characteristic evaluation | | | | | |
| Elastic layer resistance (Ω · cm) L/L | 3.13E+05 | 9.91E+03 | 1.55E+04 | 3.34E+04 | 9.54E+03 |
| Elastic layer resistance (Ω · cm) H/H | 3.25E+05 | 1.11E+04 | 1.71E+04 | 3.55E+04 | 1.03E+04 |
| Surface layer resistance (Ω · cm) L/L | 7.91E+06 | 1.01E+07 | 3.03E+07 | 2.39E+07 | 1.71E+07 |
| Surface layer resistance (Ω · cm) H/H | 7.20E+04 | 8.10E+04 | 3.03E+07 | 9.31E+05 | 4.71E+05 |
| Environmental variation digit (surface layer) | 2.04 | 2.10 | 0.00 | 1.41 | 1.56 |
| Water content (mass %) | 5.21 | 4.94 | 1.13 | 4.06 | 7.57 |
| Relaxation time T2 (μsec) | 467 | 315 | 305 | 451 | 498 |
| Bleed evaluation | B | B | A | A | B |
| Image evaluation | | | | | |
| Pinhole leak evaluation | A | A | A | A | A |
| Horizontal streak evaluation | B | A | C | B | B |
| Discharge current amount (μA) | 69 | 81 | 32 | 49 | 53 |

TABLE 5-8

| | Example 36 | Example 37 | Example 38 | Example 39 | Example 40 |
|---|---|---|---|---|---|
| Elastic layer | NBR | NBR | NBR | NBR | NBR |
| Surface layer coating liquid No. | Coating liquid 36 | Coating liquid 37 | Coating liquid 38 | Coating liquid 39 | Coating liquid 40 |
| Surface layer film thickness (μm) | 29 | 41 | 43 | 35 | 4 |
| Characteristic evaluation | | | | | |
| Elastic layer resistance (Ω · cm) L/L | 1.17E+04 | 4.61E+05 | 1.30E+05 | 6.33E+04 | 9.10E+03 |
| Elastic layer resistance (Ω · cm) H/H | 1.31E+04 | 4.84E+05 | 1.44E+05 | 6.71E+04 | 9.20E+03 |
| Surface layer resistance (Ω · cm) L/L | 1.13E+07 | 2.11E+07 | 8.67E+06 | 7.91E+06 | 3.91E+07 |
| Surface layer resistance (Ω · cm) H/H | 2.36E+05 | 2.33E+06 | 7.77E+05 | 3.37E+05 | 7.19E+05 |
| Environmental variation digit (surface layer) | 1.68 | 0.96 | 1.05 | 1.37 | 1.74 |
| Water content (mass %) | 9.55 | 0.79 | 3.51 | 7.23 | 5.71 |
| Relaxation time T2 (μsec) | 710 | 416 | 631 | 899 | 280 |
| Bleed evaluation | B | A | A | B | B |
| Image evaluation | | | | | |
| Pinhole leak evaluation | A | A | A | A | B |
| Horizontal streak evaluation | B | B | A | A | C |
| Discharge current amount (μA) | 60 | 29 | 43 | 50 | 66 |

Examples 41 and 42

An electro-conductive roller 41 or 42 was produced and evaluated in the same way as in Example 1 except for using an elastic roller produced from an unvulcanized rubber composition obtained by mixing materials shown in Table 6 below with an open roll and using each coating liquid shown in Table 8 in place of the coating liquid 1. Table 8 shows the results of the evaluations.

TABLE 6

| Material | Blending amount (part(s) by mass) |
|---|---|
| Epichlorohydrin-ethylene oxide-allylglycidyl ether terpolymer (GECO) (trade name: EPICHLOMER CG-102, manufactured by DAISO CO., LTD.) | 100 |
| Zinc oxide (ZINC OXIDE TYPE II manufactured by SEIDO CHEMICAL INDUSTRY CO., LTD.) | 5 |
| Calcium carbonate (SILVER W manufactured by SHIRAISHI CALCIUM KAISHA, LTD.) | 35 |
| Carbon black (SEAST SO manufactured by TOKAI CARBON CO., LTD.) | 0.5 |
| Stearic acid | 2 |
| Adipic acid ester (POLYCIZER W305ELS manufactured by DIC CORPORATION) | 10 |
| Sulfur | 0.5 |
| Dipentamethylene thiuram tetrasulfide (NOCCELER TRA manufactured by OUCHI SHINKO CHEMICAL INDUSTRIAL CO., LTD.) | 2 |
| Cethyltrimethylammonium bromide | 2 |

Example 43

This example relates to an electro-conductive member having a construction in which the electro-conductive layer of the present invention is provided on the outer periphery of a mandrel illustrated in FIG. 1A.

A material (not containing an IPA dilution) similar to the coating liquid 12 was used as a "resin for an electro-conductive layer". A cored bar (electro-conductive mandrel) of a stainless steel bar having an outer diameter ϕ of 6 mm and a length of 258 mm was placed in a die, and the resin was injected into a cavity formed in the die. Next, the die was heated at 90° C. for 1 hour and further heated at 160° C. for 1 hour. Then, the resin was released from the die after the die was cooled to room temperature, and an elastic layer having a thickness of 1.25 mm was provided on the outer peripheral surface of the cored bar. An electro-conductive roller 43 thus obtained was evaluated in the same way as in Example 1. Table 8 shows the results of the evaluations.

Example 44

This example relates to an electro-conductive member having a construction in which an elastic layer, an intermediate layer (electro-conductive layer of the present invention), and a protective layer are provided in the stated order on the outer periphery of a mandrel illustrated in FIG. 1C. A protective layer was provided on the "electro-conductive roller 11" produced in the same way as in Example 11 by the following method.

Methyl isobutyl ketone was added to a caprolactone-modified acrylic polyol solution and then the solid content was adjusted to 10 mass %. A mixed solution was prepared by pouring 15 parts by mass of carbon black (HAF), 35 parts by mass of needle-like rutile-type titanium oxide fine particles, 0.1 part by mass of modified dimethyl silicone oil, and 80.14 parts by mass of a mixture containing butanone oxime block bodies of hexamethylene diisocyanate (HDI) and isophorone diisocyanate (IPDI) at 7:3 into 100 parts by mass of solid content of the acrylic polyol solution. At this time, the mixture of the block HDI and the block IPDI was added so that a ratio "NCO/OH" was 1.0.

Next, 210 g of the mixed solution and 200 g of glass beads each having an average particle diameter of 0.8 mm as media were mixed in a 450-mL glass bottle, and were then dispersed with a paint shaker dispersing machine for 24 hours. After the dispersion, 5.44 parts by mass (amount corresponding to 20 parts by mass with respect to 100 parts by mass of the acrylic polyol) of crosslinking type acrylic particles (trade name: MR50G; manufactured by Soken Chemical & Engineering Co., Ltd.) as resin particles were added to the resultant, followed by dispersion for an additional 30 minutes. Thus, a paint for forming a protective layer was obtained.

The outer periphery of the electro-conductive roller 11 was subjected to dip coating once with the paint in the same way as in Example 1. The resultant coated product was air-dried at normal temperature for 30 minutes or more. Next, the product was dried with a hot air-circulating dryer set to 90° C. for 1 hour. Further, the product was dried with a hot air-circulating dryer set to 160° C. for 1 hour. Thus, the protective layer was formed on the outer peripheral surface of the electro-conductive roller. An electro-conductive roller 44 thus obtained was evaluated in the same way as in Example 1. Table 8 shows the results of the evaluations.

Example 45

An unvulcanized rubber composition was prepared by mixing materials described in Table 7 below. A cored bar (electro-conductive mandrel) of a stainless steel bar having an outer diameter ϕ of 6 mm and a length of 258 mm was placed in a die, and the unvulcanized rubber composition was injected into a cavity formed in the die.

TABLE 7

| Material | Blending amount (part(s) by mass) |
|---|---|
| Liquid Silicone rubber (trade name: SE6724A/B manufactured by Dow Corning Toray Co., Ltd.) | 100 |
| Carbon black (trade name: Toka black #7360SB, Manufactured by TOKAI CARBON CO., LTD.) | 28 |
| Silica powder | 0.2 |
| Platinum catalyst | 0.1 |

Next, the die was heated at 120° C. for 8 minutes, and the resultant was released from the die after the die was cooled to room temperature. After that, the product was heated at 200° C. for 60 minutes to be vulcanized and cured, thereby providing an elastic layer having a thickness of 3.0 mm on an outer peripheral surface of the cored bar. Then, a surface layer was formed on an outer peripheral surface of the elastic layer in the same way as in Example 1 through use of the coating liquid 11 shown in Table 4-3 to obtain an electro-conductive roller 45. The electro-conductive roller 45 was subjected to the following image formation test. Table 8 shows the results of the evaluation.

(Evaluation 8: Evaluation for Fogging)

The electro-conductive roller 45 was mounted as a developing roller on a cartridge for a color laser printer (trade name: Color LaserJet CP2025dn, manufactured by Hewlett-Packard Japan, Ltd.). A magenta toner mounted on the cartridge was used as toner without being treated. The cartridge on which the developing roller had been mounted was left to stand under the L/L environment for 24 hours. After that, the cartridge was incorporated into the color laser printer that had been left to stand under the same environment as that of the cartridge. 6,000 Images each having a print percentage of 1% were output under the environment and then a solid white image was output on 1 sheet of glossy paper. The average of the reflection densities of the output solid white image measured at 16 points (respective central points of 16 squares obtained by equally dividing the glossy paper into 4 sections in its longitudinal direction and equally dividing the paper into 4 sections in its horizontal direction) was defined as Ds (%), the average of the reflection densities of the glossy paper before the output of the solid white image measured at the 16 points was defined as Dr (%), and Ds-Dr was defined as a "fogging amount." It should be noted that the reflection densities were measured with a reflection densitometer (trade name: White Photometer TC-6DS/A, manufactured by Tokyo Denshoku CO., LTD.). Fogging was evaluated as described below.

A: The fogging amount is less than 0.5%.

B: The fogging amount is 0.5% or more and less than 2%.

C: The fogging amount is 2% or more and less than 5%.

D: The fogging amount is 5% or more.

Example 46

An electro-conductive roller 46 produced in the same way as in Example 45 was incorporated as a primary transfer roller in an electrophotographic laser printer (trade name: HP Color Laserjet Enterprise CP4525dn, manufactured by Hewlett-Packard Company), and images were output. The electrophotographic laser printer having the transfer roller incorporated therein was left to stand for 48 hours under the L/L environment, and 6,000 images each having a print percentage of 1% were then output under the environment. After that, a half-tone image (image in which horizontal lines each having a width of 1 dot were drawn in a direction perpendicular to the rotation direction of a photosensitive member at an interval of 2 dots) was output. As a result, a satisfactory image was obtained without any problem.

TABLE 8

| | Example 41 | Example 42 | Example 43 | Example 44 | Example 45 | Example 46 |
|---|---|---|---|---|---|---|
| Elastic layer | Hydrin | Hydrin | — | NBR | Silicone | Silicone |
| Surface layer coating liquid No. | Coating liquid 11 | Coating liquid 15 | Coating liquid 11 | Coating liquid 11/ Protective layer | Coating liquid 11 | Coating liquid 11 |
| Surface layer film thickness (μm) | 11 | 12 | 1,260 | 14 | 89 | 64 |
| Characteristic evaluation | | | | | | |
| Elastic layer resistance (Ω · cm) L/L | 2.90E+07 | 2.90E+07 | — | 2.97E+05 | 7.31E+06 | 7.50E+06 |
| Elastic layer resistance (Ω · cm) H/H | 7.92E+05 | 7.92E+05 | — | 3.03E+05 | 7.55E+06 | 7.71E+06 |
| Surface layer resistance (Ω · cm) L/L | 1.01E+07 | 7.65E+06 | 1.01E+07 | 1.01E+07 | 1.01E+07 | 1.01E+07 |
| Surface layer resistance (Ω · cm) H/H | 1.10E+06 | 5.17E+05 | 1.10E+06 | 1.10E+06 | 1.10E+06 | 1.10E+06 |
| Environmental variation digit (surface layer) | 0.96 | 1.17 | 0.96 | 0.96 | 0.96 | 0.96 |
| Water content (mass %) | 0.51 | 2.55 | 0.57 | 0.51 | 0.76 | 0.76 |
| Relaxation time T2 (μsec) | 781 | 1,117 | 781 | 781 | 781 | 781 |
| Bleed evaluation | B | B | A | A | A | A |
| Image evaluation | | | | | | |
| Pinhole leak evaluation | A | A | A | A | A | — |
| Horizontal streak evaluation | B | A | B | A | — | — |
| Discharge current amount (μA) | 15 | 31 | 12 | 39 | — | — |
| Fogging evaluation (developing roller) | — | — | — | — | A | — |

COMPARATIVE EXAMPLES

Comparative Example 1

An electro-conductive roller was produced and evaluated in the same way as in Example 1 except for using a coating liquid 41 as a coating liquid. It should be noted that the T2 relaxation time of the electro-conductive layer does not satisfy the requirements of the present invention. Table 9 shows the results of the evaluation.

Comparative Example 2

An electro-conductive roller was produced and evaluated in the same way as in Example 1 except for using a coating liquid 42 as a coating liquid. It should be noted that the water content of the electro-conductive layer does not satisfy the requirements of the present invention. Table 9 shows the results of the evaluation.

Comparative Example 3

An electro-conductive roller was produced and evaluated in the same way as in Example 1 except for using a coating liquid 43 as a coating liquid. It should be noted that the T2 relaxation time and the water content of the electro-conductive layer do not satisfy the requirements of the present invention. Table 9 shows the results of the evaluation.

Comparative Example 4

An electro-conductive roller was produced and evaluated in the same way as in Example 1 except for using a coating liquid 44 as a coating liquid. It should be noted that the ionic electro-conductive agent of the coating liquid 44 does not have a reactive functional group, and hence is not fixed to the binder resin and does not satisfy the requirements of the present invention. Table 9 shows the results of the evaluation.

Comparative Example 5

An electro-conductive roller was produced and evaluated in the same way as in Example 1 except for using a coating liquid 45 as a coating liquid. It should be noted that the binder resin of the coating liquid 45 does not have an alkylene oxide structure, and hence does not satisfy the requirements of the present invention. Table 9 shows the results of the evaluation.

TABLE 9

| | Comparative Example 1 | Comparative Example 2 | Comparative Example 3 | Comparative Example 4 | Comparative Example 5 |
|---|---|---|---|---|---|
| Elastic layer | NBR | NBR | NBR | NBR | NBR |
| Surface layer coating liquid No. | Coating liquid 41 | Coating liquid 42 | Coating liquid 43 | Coating liquid 44 | Coating liquid 45 |
| Surface layer film thickness (μm) | 12 | 4 | 13 | 16 | 25 |
| Characteristic evaluation | | | | | |
| Elastic layer resistance (Ω · cm) L/L | 5.15E+05 | 7.31E+03 | 4.69E+05 | 2.33E+04 | 3.11E+05 |
| Elastic layer resistance (Ω · cm) H/H | 5.46E+05 | 7.53E+03 | 4.74E+05 | 2.52E+04 | 3.23E+05 |
| Surface layer resistance (Ω · cm) L/L | 7.69E+08 | 3.57E+06 | 5.61E+07 | 3.31E+07 | 2.21E+10 |
| Surface layer resistance (Ω · cm) H/H | 1.65E+06 | 2.16E+04 | 3.69E+04 | 4.66E+06 | 1.03E+10 |
| Environmental variation digit (surface layer) | 2.67 | 2.22 | 3.18 | 0.85 | 0.33 |
| Water content (mass %) | 6.57 | 12.1 | 13.6 | 1.01 | 0.11 |
| Relaxation time T2 (μsec) | 24.9 | 1,891 | 187 | 773 | 1,035 |
| Bleed evaluation | A | C | C | D | A |
| Image evaluation | | | | | |
| Pinhole leak evaluation | A | C | A | A | A |
| Horizontal streak evaluation | D | A | D | D | D |
| Discharge current amount (μA) | 39 | 110 | 105 | 45 | — |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2011-284452 filed on Dec. 26, 2011, the content of which is hereby incorporated by reference.

What is claimed is:

1. An electro-conductive member for electrophotography, comprising:

an electro-conductive mandrel; and an electro-conductive layer provided on a periphery thereof, wherein the electro-conductive layer contains a binder resin having, in a molecule thereof, an alkylene oxide structure, and a sulfo group or a quaternary ammonium group as an ion exchange group, and an ion having polarity opposite to polarity of the ion exchange group, a water content of the electro-conductive layer under an environment of a temperature of 30° C. and a relative humidity of 80% is 10 mass % or less, and a spin-spin relaxation time T2 of the electro-conductive layer, which is determined by pulse NMR measurement with a hydrogen core being a measurement core under an environment of a temperature of 15° C. and a relative humidity of 10%, is 200 μsec or more.

2. The electro-conductive member according to claim 1, wherein the alkylene oxide structure comprises any structure selected from the group consisting of structures represented by the following chemical formula (1)-1 to the following chemical formula (1)-3:

Formula (1)-1

$$-\!\!\left[CH_2-CH_2-O\right]_m\!\!-$$

Formula (1)-2

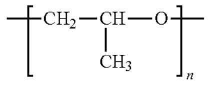

Formula (1)-3

$$-\!\!\left[CH_2-CH_2-CH_2-CH_2-O\right]_p\!\!-$$

where m, n, and p each independently represent an integer of 1 or more.

3. The electro-conductive member according to claim 2, wherein a content of the structure represented by the chemical formula (1)-1 in the binder resin is 30 mass % or less.

4. The electro-conductive member according to claim 1, wherein the binder resin comprises a siloxane structure.

5. The electro-conductive member according to claim 1, wherein the binder resin comprises any resin selected from the group consisting of an epoxy resin, a urethane resin, a urea resin, an amide resin, and an ester resin.

6. The electro-conductive member according to claim 2, wherein the binder resin has a moiety obtained by linking any structure selected from the group consisting of the structures represented by the chemical formula (1)-1 to the chemical formula (1)-3, and a structure represented by the following chemical formula (2) with a linking group containing any structure selected from the group consisting of structures represented by the following chemical formula (3)-1 to the following chemical formula (3)-7:

Formula (2)

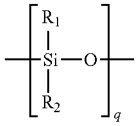

where $R_1$ and $R_2$ each independently represent a methyl group or an unsubstituted phenyl group, and q represents an integer of 1 or more Formula (3)-1

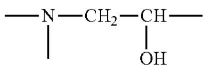

Formula (3)-2

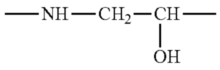

Formula (3)-3

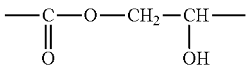

Formula (3)-4

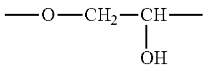

Formula (3)-5

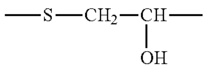

Formula (3)-6

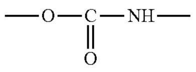

Formula (3)-7

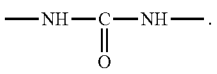

7. The electro-conductive member according to claim 2, wherein the binder resin has a moiety obtained by linking any structure selected from the group consisting of the structures represented by the chemical formula (1)-1 to the chemical formula (1)-3, and a structure represented by the following chemical formula (2) with a linking group containing any structure selected from the group consisting of structures represented by the following chemical formula (4)-1 to the following chemical formula (4)-3:

Formula (2)

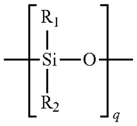

where $R_1$ and $R_2$ each independently represent a methyl group or an unsubstituted phenyl group, and q represents an integer of 1 or more; and Formula (4)-1

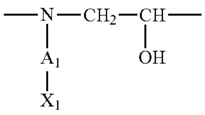

Formula (4)-2

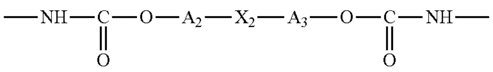

Formula (4)-3

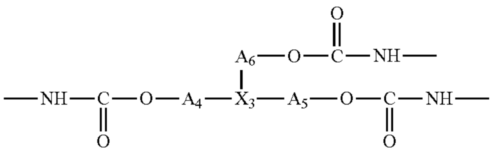

where $A_1$ to $A_6$ each independently represent an organic group and $X_1$ to $X_3$ each independently represent an ion exchange group.

8. The electro-conductive member according to claim 1, wherein a molecular terminal of the binder resin contains at least one structure selected from the group consisting of structures represented by the following chemical formula (5)-1 to the following chemical formula (5)-6:

Formula (5)-1

$$-NH-A_7-X_4$$

Formula (5)-2

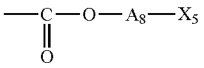

Formula (5)-3

$$-O-A_9-X_6$$

Formula (5)-4

$$-S-A_{10}-X_7$$

Formula (5)-5

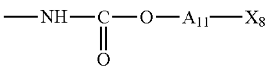

Formula (5)-6

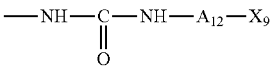

where $A_7$ to $A_{12}$ each independently represent an organic group and $X_4$ to $X_9$ each independently represent an ion exchange group.

9. The electro-conductive member according to claim 1, wherein the ion exchange group comprises a quaternary ammonium group and the ion having the polarity opposite to the polarity of the ion exchange group comprises a sulfonylimide ion.

10. A process cartridge, comprising the electro-conductive member according to claim 1, wherein the process cartridge is detachably mountable to a main body of an electrophotographic apparatus.

11. An electrophotographic apparatus, comprising the electro-conductive member according to claim 1.

* * * * *